(12) United States Patent
Inokuchi

(10) Patent No.: US 10,670,924 B2
(45) Date of Patent: Jun. 2, 2020

(54) DISPLAY AND METHOD OF MANUFACTURING DISPLAY

(71) Applicant: TOPPAN PRINTING CO., LTD., Tokyo (JP)

(72) Inventor: Masami Inokuchi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 78 days.

(21) Appl. No.: 16/123,589

(22) Filed: Sep. 6, 2018

(65) Prior Publication Data

US 2019/0056628 A1    Feb. 21, 2019

Related U.S. Application Data

(63) Continuation of application No. PCT/JP2017/009223, filed on Mar. 8, 2017.

(30) Foreign Application Priority Data

Mar. 8, 2016   (JP) ................................. 2016-044523

(51) Int. Cl.
*G02F 1/1337*   (2006.01)
*B42D 25/364*   (2014.01)
(Continued)

(52) U.S. Cl.
CPC ..... *G02F 1/133788* (2013.01); *B42D 25/364* (2014.10); *C09J 7/38* (2018.01);
(Continued)

(58) Field of Classification Search
CPC ......... G02F 1/133788; G02F 1/133753; G02F 1/133711; G02F 1/133553;
(Continued)

(56) References Cited

U.S. PATENT DOCUMENTS

| | | | |
|---|---|---|---|
| 2007/0054198 A1* | 3/2007 | Park | G03F 7/70466 430/5 |
| 2009/0290079 A1* | 11/2009 | Evans | G02B 27/2278 349/18 |
| 2011/0002039 A1* | 1/2011 | Seo | G02B 27/285 359/485.01 |

FOREIGN PATENT DOCUMENTS

JP    4194377 B2  *  12/2008

OTHER PUBLICATIONS

International Search Report regarding Int'l Application No. PCT/JP2017/009223, dated Jun. 6, 2017, 2 pps.

* cited by examiner

*Primary Examiner* — Huyen L Ngo
(74) *Attorney, Agent, or Firm* — Foley & Lardner LLP

(57) ABSTRACT

In an alignment regulating layer, a plurality of regulation regions is defined in plan view perpendicular to the surface of the alignment regulating layer, and the plurality of regulation regions includes at least one first regulation region, at least one second regulation region, and a third regulation region fitted between the first regulation region and the second regulation region. The alignment regulating direction in the first regulation region is a first regulating direction, and the alignment regulating direction in the second regulation region is a second regulating direction that is different from the first regulating direction. In the third regulation region, the alignment regulating direction continuously changes from the first regulating direction to the second regulating direction from a portion contacting the first regulation region toward a portion contacting the second regulation region.

5 Claims, 11 Drawing Sheets

(51) Int. Cl.
*G02F 1/1335* (2006.01)
*G02B 5/30* (2006.01)
*C09J 7/38* (2018.01)

(52) U.S. Cl.
CPC ..... *G02B 5/3016* (2013.01); *G02F 1/133528* (2013.01); *G02F 1/133553* (2013.01); *G02F 1/133711* (2013.01); *G02F 1/133753* (2013.01); *C09J 2203/318* (2013.01); *G02B 5/3033* (2013.01)

(58) Field of Classification Search
CPC ............ G02F 1/133528; G02B 5/3016; G02B 5/3033; B42D 25/364; C09J 7/38; C09J 2203/318
See application file for complete search history.

DISPLAY AND METHOD OF MANUFACTURING DISPLAY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/009223, filed on Mar. 8, 2017, which is based upon and claims the benefit of priority to Japanese Patent Application No. 2016-044523, filed on Mar. 8, 2016. The disclosures of which are all hereby incorporated herein by reference in their entireties.

TECHNICAL FIELD

The present invention relates to a display in which a latent image contained therein is developed by a polarizing plate being held over the display, and a method of manufacturing the display.

BACKGROUND ART

Authentication media, such as cards and passports, and securities, such as gift certificates and stock certificates, are provided with a display that is less likely to be counterfeited to determine the authenticity of them. As a display that is less likely to be counterfeited, there is known a display including an alignment regulating layer and a liquid crystal layer contacting a surface of the alignment regulating layer. In this display, the alignment of molecules contained in the liquid crystal layer is determined by the alignment regulating layer.

There is also known a display including an alignment regulating layer and a liquid crystal layer. In this display, the alignment regulating layer includes a first region in which molecules are aligned in a first direction, and a second region in which the molecules are aligned in a second direction that is different from the first direction. Also, in this display, the liquid crystal layer includes a first region in which the molecules are aligned in the first direction, and a second region in which the molecules are aligned in the second direction (see, for example, PTL 1).

Citation List

[Patent Literature] [PTL 1] JP H08-15681 A

SUMMARY OF THE INVENTION

Technical Problem

In a configuration proposed for a display, plural regions having different molecular alignments is connected to each other in a liquid crystal layer. In such a display, an image visually recognized through a polarizing plate changes with a change in the angle formed between the direction in which the molecules are aligned in the liquid crystal layer and the optical axis of the polarizing plate in a state where the polarizing plate is held over the display. However, in this display, brightness and color differences, i.e. differences in visual characteristics, are considerably larger between adjacent regions than that in other portions of each these adjacent regions. Therefore, there has been a demand for displays in which visual characteristics more gradually change between adjacent regions in terms of increasing the quality of images displayed by displays.

Such a gradual change is commonly required not only in displays for determining the authenticity of authentication media or securities, but also in displays for decorating articles provided with the displays, as well as displays that themselves are observation objects.

An object of the present invention is to provide a display that can smoothly change visual characteristics on the boundary between adjacent regions in an image displayed by the display, and a method of manufacturing the display.

Solution to Problem

A display for attempting to improve or solve the above issues includes a liquid crystal layer containing liquid crystal molecules, and an alignment regulating layer having a surface contacting the liquid crystal layer, and having characteristics of regulating alignment of the liquid crystal molecules. In the alignment regulating layer, a plurality of regulation regions is defined in plan view perpendicular to the above surface, and the plurality of regulation regions includes at least one first regulation region, at least one second regulation region, and a third regulation region fitted between the first regulation region and the second regulation region. In the alignment regulating layer, a direction in which the alignment of the liquid crystal molecules is regulated is an alignment regulating direction; the alignment regulating direction in the first regulation region is a first regulating direction, and the alignment regulating direction in the second regulation region is a second regulating direction that is different from the first regulating direction. In the third regulation region, the alignment regulating direction continuously changes from the first regulating direction to the second regulating direction from a portion contacting the first regulation region toward a portion contacting the second regulation region.

A method of manufacturing a display for solving the above issues includes forming an alignment regulating layer having a surface, and forming a liquid crystal layer containing liquid crystal molecules on the surface of the alignment regulating layer. The forming of the alignment regulating layer includes forming a plurality of regulation regions in the alignment regulating layer in plan view perpendicular to the above surface, and the plurality of regulation regions includes at least one first regulation region, at least one second regulation region, and a third regulation region fitted between the first regulation region and the second regulation region. In the alignment regulating layer, a direction in which the alignment of the liquid crystal molecules is regulated is an alignment regulating direction; the alignment regulating direction in the first regulation region is a first regulating direction, and the alignment regulating direction in the second regulation region is a second regulating direction that is different from the first regulating direction. In the third regulation region, the alignment regulating direction continuously changes from the first regulating direction to the second regulating direction from a portion contacting the first regulation region toward a portion contacting the second regulation region.

According to the above configuration, in the third regulation region on the boundary between the first regulation region and the second regulation region in the alignment regulating layer, the direction in which the alignment of the liquid crystal molecules is regulated continuously changes from the first regulating direction to the second regulating direction along a direction from the first regulation region toward the second regulation region. Therefore, in the third alignment region of the liquid crystal layer, the alignment direction of the liquid crystal molecules continuously changes from one direction determined by the first regulating direction to the other direction determined by the second regulating direction. Accordingly, compared with a configuration in which the alignment direction of the liquid crystal molecules changes only between the one direction and the other direction mentioned above between the first alignment region and the second alignment region in the liquid crystal layer, changes in the image displayed by the display are smoothed.

DESCRIPTION OF REPRESENTATIVE EMBODIMENT

With reference to FIGS. 1 to 13, a display and a method of manufacturing the display according to a first embodiment of the present invention will be described. In the following description, a configuration of the display, the method of manufacturing the display, functions of the display, and examples will be individually described.

First Embodiment

With reference to FIGS. 1 to 4, the configuration of the display will be described.

[Configuration of Display]

Figure 1:
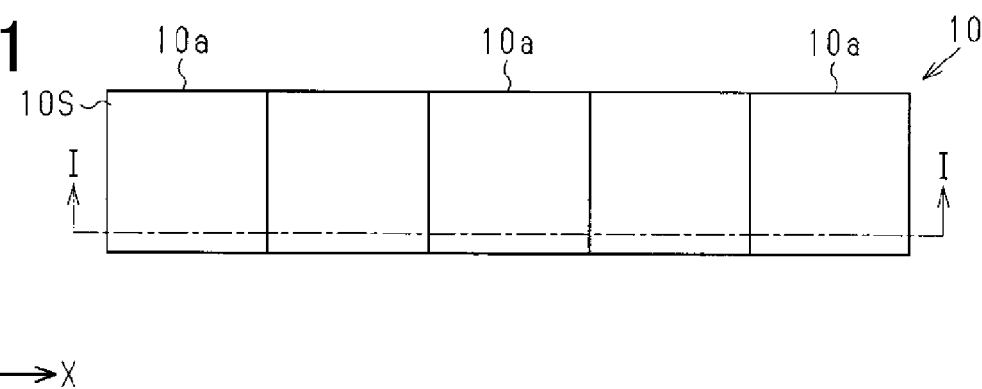
FIG. 1 is a plan view showing a structure of a display as viewed perpendicular to the display, according to a first embodiment of the present invention.

As shown in FIG. 1, a display 10 has a surface 10S, and is defined with a plurality of display units 10a arranged along the X-direction, which is one direction, in plan view perpendicular to the surface 10S of the display 10. The display 10 is defined to have, for example, five display units 10a. When the display 10 is visually observed, each display unit 10a is not distinguishable from the rest of the display units 10a.

One direction orthogonal to the X-direction is the Y-direction, and the surface 10S of the display 10 is in the X-Y plane. The direction parallel to the thickness direction of the display 10 is the Z-direction.

Figure 2:
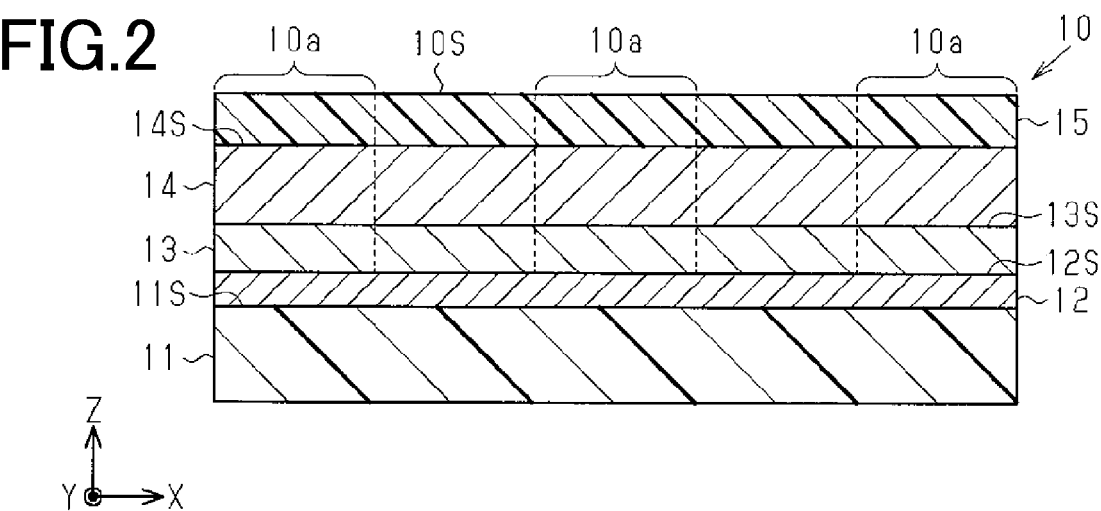
FIG. 2 is a cross-sectional view showing a structure of the display taken along the line I-I of FIG. 1.

As shown in FIG. 2, the display 10 includes a substrate 11, a reflective layer 12, an alignment regulating layer 13, a liquid crystal layer 14, and a protective layer 15. The protective layer 15 has a surface opposite to a surface contacting the liquid crystal layer 14, the surface being a surface 10S of the display 10, that is, a front surface of the display 10 to be observed by an observer.

The substrate 11 is made of, for example, a resin and faces the alignment regulating layer 13 with the reflective layer 12 interposed therebetween. That is, the reflective layer 12 is provided between the substrate 11 and the alignment regulating layer 13. The substrate 11 has a front surface 11S provided with the reflective layer 12 which covers the entire front surface 11S of the substrate 11. The reflective layer 12 may cover part of the front surface 11S.

The reflective layer 12 has a surface 12S opposite to a surface contacting the substrate 11. The reflective layer 12 may have light-scattering properties. When the reflective layer 12 has light-scattering properties, the surface 12S may only have to have a surface roughness, for example, of causing light scattering. Moreover, the reflective layer 12 may have a monolayer structure, or may have a multilayer structure.

The liquid crystal layer 14 has a surface 14S opposite to a surface contacting the alignment regulating layer 13. The surface 14S of the liquid crystal layer 14 is covered with protective layer 15. The protective layer 15 has light transmissivity, and may be colorless and transparent, or may be colored and transparent. The protective layer 15 also has optical isotropy. The protective layer 15 prevents the layers provided below, such as the liquid crystal layer 14, from being damaged or being deteriorated by light to prevent the image displayed by the display 10 from being deteriorated. The protective layer 15 may have a monolayer structure, or may have a multilayer structure.

The liquid crystal layer 14 contains liquid crystal molecules and has birefringence. In the liquid crystal layer 14, a direction parallel to the surface 14S of the liquid crystal layer 14, and in which the liquid crystal molecules are aligned is an alignment direction. The liquid crystal layer 14 preferably has a thickness with which the phase difference of the liquid crystal layer 14 is, for example, $\lambda/4$. Specifically, the liquid crystal layer 14 may be designed to have a thickness in the range of 0.6 µm or more and 1.2 µm or less.

The alignment regulating layer 13 has a surface 13S contacting the liquid crystal layer 14, and has characteristics of regulating the alignment direction of the liquid crystal molecules contained in the liquid crystal layer 14. The alignment regulating layer 13 contains photoreactive molecules that exhibit characteristics of regulating the alignment direction of the liquid crystal molecules by irradiation with light. For example, the forming material of the photoreactive molecule may be any one of molecule that is photoisomerized, photodimerized, photocrosslinked, or photodegraded by irradiation with light. Specifically, the alignment regulating layer 13 may be designed to have a thickness in the range of 10 nm or more and 50 nm or less.

The alignment regulating layer 13 has characteristics of aligning the liquid crystal molecules contained in the liquid crystal layer 14, as described above. In the alignment regulating layer 13, a direction in which the alignment of the liquid crystal molecules is regulated, that is, a direction parallel to the surface 13S of the alignment regulating layer 13, is the alignment regulating direction. The alignment direction in the liquid crystal layer 14 is substantially equal to the alignment regulating direction in the alignment regulating layer 13.

Figure 3:
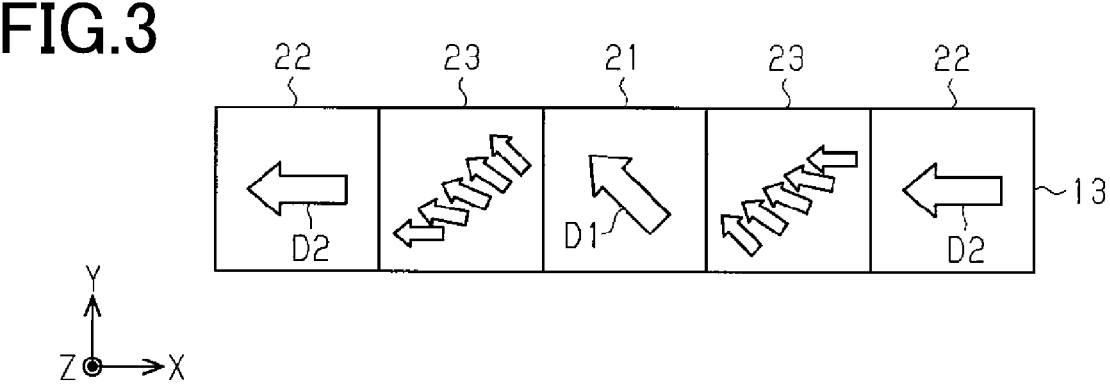
FIG. 3 is a schematic view showing alignment regulating directions in an alignment regulating layer provided in the display.

FIG. 3 is a plan view showing a structure of the alignment regulating layer 13 in plan view perpendicular to the surface 10S of the display 10, that is in plan view perpendicular to the surface 13S of the alignment regulating layer 13. In FIG. 3, the arrows schematically show alignment regulating directions in portions of the alignment regulating layer 13.

In the alignment regulating layer 13, a plurality of regulation regions is defined in plan view perpendicular to the surface 10S of the display 10, and the plurality of regulation regions includes at least one first regulation region 21 and at least one second regulation region 22. In the alignment regulating layer 13, a third regulation region 23 is fitted or defined between the first regulation region 21 and the second regulation region 22.

The plurality of regulation regions defined in the alignment regulating layer 13 includes at least one first regulation region 21 and at least one second regulation region 22, and the first and second regulation regions 21 and 22 are arranged adjacent to each other in the X-direction.

In the alignment regulating layer 13, a direction in which the alignment direction of the liquid crystal molecules is regulated is the alignment regulating direction. The alignment regulating direction in the first regulation region 21 is a first regulating direction D1, and the alignment regulating direction in the second regulation region 22 is a second regulating direction D2. In the third regulation region 23, the alignment regulating direction continuously changes from the first regulating direction D1 to the second regulating direction D2 from a portion contacting the first regulation region 21 toward a portion contacting the second regulation region 22 along a direction from the first regulation region 21 toward the second regulation region 22.

As alignment regulating directions, the first regulation region 21 has only the first regulating direction D1, and the second regulation region 22 has only the second regulating direction D2, respectively.

In contrast, the third regulation region 23 has a plurality of alignment regulating directions that continuously changes from the first regulating direction D1 to the second regulating direction D2 from a portion contacting the first regulation region 21 toward a portion contacting the second regulation region 22. In each third regulation region 23, the alignment direction changes substantially continuously between the first and second regulating directions D1 and D2.

Figure 4:
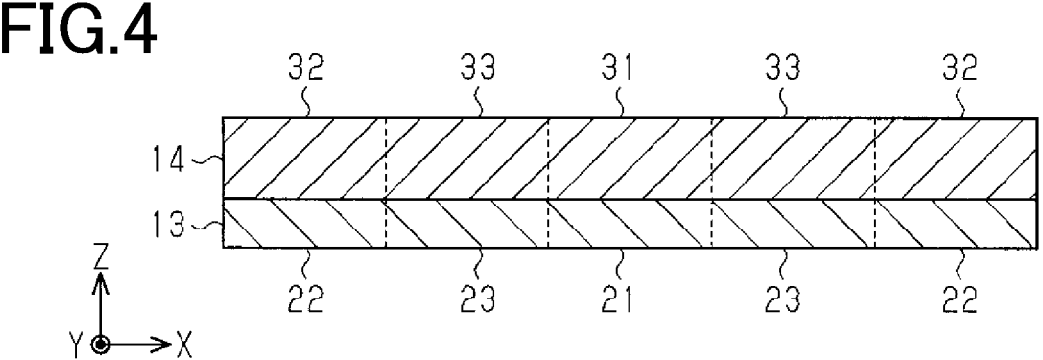
FIG. 4 is a cross-sectional view of a structure of the alignment regulating layer and a liquid crystal layer provided in the display.

As shown in FIG. 4, the liquid crystal layer 14 includes a first alignment region 31 that aligns with the first regulation region 21, a second alignment region 32 that aligns with the second regulation region 22, and a third alignment region 33 that aligns with the third regulation region 23 in plan view perpendicular to the surface 10S of the display 10.

In the liquid crystal layer 14, the alignment direction in the first alignment region 31 is a first alignment direction, and the alignment direction in the second alignment region 32 is a second alignment direction. The first alignment direction is substantially equal to the first regulating direction D1 in the first regulation region 21, and the second alignment direction is substantially equal to the second regulating direction D2 in the second regulation region 22.

In contrast, the alignment direction in the third alignment region 33 continuously changes from the first alignment direction to the second alignment direction along the X-direction from a portion contacting the first alignment region 31 toward a portion contacting the second alignment region 32. The alignment direction in the third alignment region 33 changes substantially continuously in the third alignment region 33, as with the alignment regulating direction in the third regulation region 23.

In plan view perpendicular to the surface 10S of the display 10, portions of the alignment regulating layer 13 respectively including the first alignment region 31, the second alignment region 32, and the third alignment region 33 each constitute one display unit 10a.

In the display 10, in the third regulation region 23 of the alignment regulating layer 13 on the boundary between the first and second regulation regions 21 and 22, the alignment regulating direction continuously changes from the first regulating direction D1 to the second regulating direction D2. Therefore, in the third alignment region 33 of the liquid crystal layer 14, the alignment direction of the liquid crystal molecules continuously changes from the first alignment direction determined by the first regulating direction D1 to the second alignment direction determined by the second regulating direction D2.

Accordingly, compared with a configuration in which the alignment direction of the liquid crystal molecules changes only between the first alignment direction and second alignment direction between the first alignment region 31 and the second alignment region 32 in the liquid crystal layer 14, the change in brightness as visual characteristics is smoothed on the boundary of the adjacent regions in the image displayed by the display 10.

[Method of Manufacturing Display]

The method of manufacturing the display 10 includes forming an alignment regulating layer 13 having a surface 13S, and forming a liquid crystal layer 14 containing liquid crystal molecules on the surface 13S of the alignment regulating layer 13.

The forming of the alignment regulating layer 13, a plurality of regulation regions including a first regulation region 21 and a second regulation region 22 is defined, in plan view perpendicular to the surface 13S. Further, in the forming of the alignment regulating layer 13, a third regulation region 23 is fitted or defined between the first regulation region 21 and the second regulation region 22.

With reference to FIGS. 5 to 12, as an example of a method of manufacturing such a display 10, method of forming the alignment regulating layer 13 using photoreactive molecules will be described below.

Figure 5:
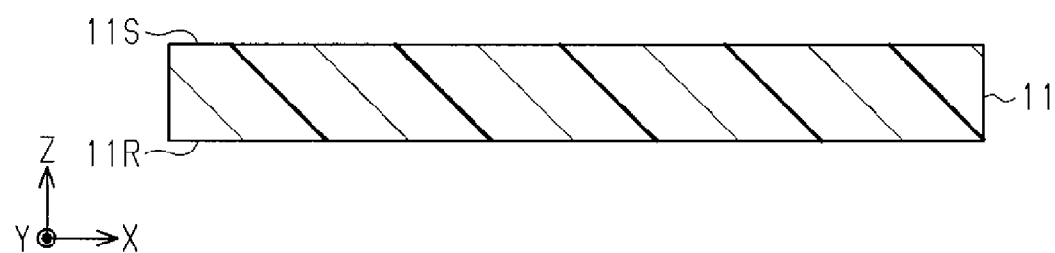
FIG. 5 is a diagram illustrating a step of preparing a substrate in a method of manufacturing the display according to the first embodiment of the present invention.

When manufacturing the display 10, first, a substrate 11 having a front surface 11S and a back surface 11R as shown in FIG. 5 is prepared. The substrate 11 may be made such as of an Oriented film. Oriented films are resin films, and formed by stretching. Oriented films include uniaxially oriented films and biaxially oriented films. The method of stretching films is different between uniaxially oriented films and biaxially oriented films.

Examples of the forming material of the oriented film may include cellulose, polycarbonate (PC), polyethylene (PE), polypropylene (PP), polyolefin (PO), ethylene vinyl alcohol (EVOH), polyvinyl alcohol (PVA), polyvinyl chloride, polyethylene naphthalate (PEN), polyethylene terephthalate (PET), nylon, acrylic resin, triacetyl cellulose (TAC), and the like.

The substrate 11 preferably has a thickness, for example, in the range of 5 µm or more and 50 µm or less. The substrate 11 may, or may not have light transmissivity.

The substrate 11 may have a monolayer structure, or may have a multilayer structure. At least one of the front and back surfaces 11S and 11R may entirely or partially be subjected to antistatic treatment, embossing treatment, matte treatment, or the like within a range of not affecting the image displayed by the display 10.

Figure 6:
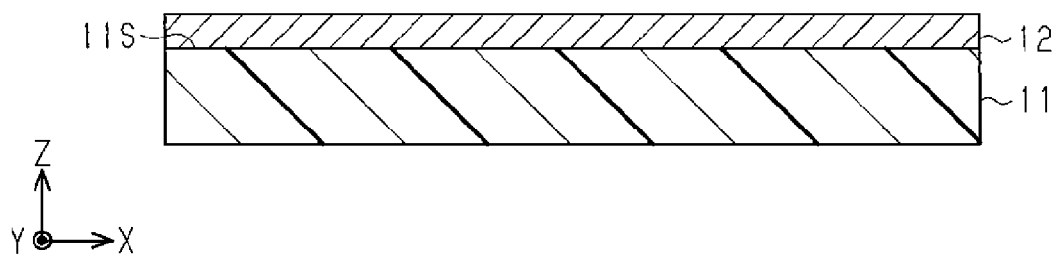
FIG. 6 is a diagram illustrating a step of forming a reflective layer in a method of manufacturing the display.

As shown in FIG. 6, a reflective layer 12 is formed on the front surface 11S of the substrate 11. The reflective layer 12 may be directly formed on the front surface 11S of the substrate 11 by a predetermined printing method or by physical vapor-phase deposition. When the reflective layer 12 is formed on the front surface 11S of the substrate 11 by printing, an ink having an effect of reflecting light may be used. The physical vapor-phase deposition includes vapor deposition and sputtering. When the reflective layer 12 is formed by physical vapor-phase deposition, examples of the forming material of the reflective layer 12 may be Al, Sn, Cr, Ni, Cu, Au, Inconel, stainless steel, or duralumin. Specifically, the reflective layer 12 may be designed to have a thickness in the range of 20 nm or more and 80 nm or less.

The reflective layer 12 may be formed on the front surface 11S of the substrate 11 by transfer from a transfer foil, or may be formed thereon by lamination. When the reflective layer 12 is formed using a transfer foil, a reflective layer may be formed on a substrate of the transfer foil by the printing method or the physical vapor-phase deposition mentioned above, followed by transferring the reflective layer formed on the transfer foil to the front surface 11S of the substrate 11. When the reflective layer 12 is formed by lamination, a laminating film having a metal foil or a metal layer may be laminated on the substrate 11.

The reflective layer 12 may be provided throughout the front surface 11S of the substrate 11, or may be provided on part of the front surface 11S. When the reflective layer 12 is provided on part of the front surface 11S of the substrate 11, the reflective layer 12 may be formed on only part of the front surface 11S of the substrate 11 by printing. Alternatively, when the reflective layer 12 is provided on part of the front surface 11S of the substrate 11, a metal layer may be formed on the entire front surface 11S of the substrate 11 by physical vapor-phase deposition, followed by patterning the metal layer by etching, laser processing, water-washing-scheelite processing, or the like.

Alternatively, the reflective layer 12 provided on only part of the front surface 11S of the substrate 11 may be formed by preparing a transfer foil having a reflective layer patterned by the above method, or preparing a laminating film having a patterned reflective layer.

The reflective layer 12 may also include a reflection-type diffraction structure that diffracts light incident on the reflective layer 12. According to the configuration in which the reflective layer 12 includes a diffraction structure, when the display 10 is provided to an article, the decorating effect of the display 10 for the article, and the effect of preventing counterfeiting of the article is enhanced.

Figure 7:
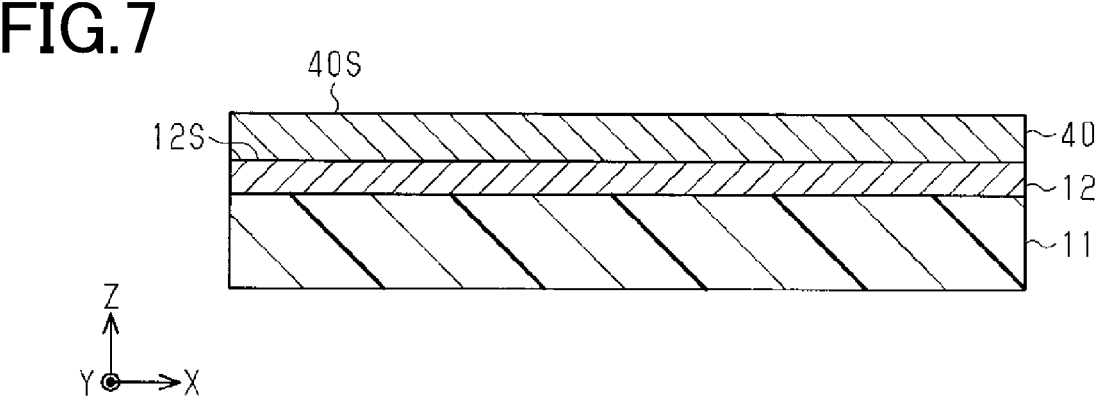
FIG. 7 is a diagram illustrating a step of forming a precursor layer in the method of manufacturing the display.

As shown in FIG. 7, a precursor layer 40 of the alignment regulating layer 13 is formed on the surface 12S of the reflective layer 12. The precursor 40 contains plural photoreactive molecules. The precursor layer 40 has a surface 40S opposite to a surface contacting the reflective layer 12. The surface 40S corresponds to the surface 13S of the alignment regulating layer 13.

For example, the forming material of the precursor layer 40 may be any one of an azobenzene derivative, cinnamic acid ester, coumarin, chalcone, benzophenone, and polyimide. An azobenzene derivative, cinnamic acid ester, coumarin, chalcone, benzophenone, and polyimide are examples of the photoreactive molecules. These materials exhibit the characteristics of regulating the alignment direction of the liquid crystal molecules by irradiation with light.

When the precursor layer 40 is formed of an azobenzene derivative, the alignment regulating layer 13 develops a predetermined alignment regulating directivity by irradiation with polarized light to photoisomerize the azobenzene derivative of the material. When the precursor layer 40 is formed of cinnamic acid ester, coumarin, chalcone, or benzophenone, the alignment regulating layer 13 develops a predetermined alignment regulating directivity by irradiation with polarized light to photodimerize or photocrosslink the derivative of the material. When the precursor layer 40 is formed of polyimide, the alignment regulating layer 13 develops a predetermined alignment regulating directivity by irradiation with polarized light to photodegrade the polyimide.

The precursor layer 40 may be formed by coating the surface 12S of the reflective layer 12 with the above forming material by any one of the coating methods selected from gravure coating or microgravure coating.

Since the reflective layer 12 is provided between the substrate 11 and the precursor layer 40, if an oriented film is used as the substrate 11, the stretching direction of the substrate 11 can be prevented from affecting the alignment direction of the molecules contained in the precursor layer 40 which is formed on the surface 12S of the reflective layer 12. Accordingly, if an oriented film is used as the substrate 11, the alignment regulating layer 13 can have a desired alignment regulating direction. Therefore, the degree of freedom of the method of forming the substrate 11 increases.

Figure 8:
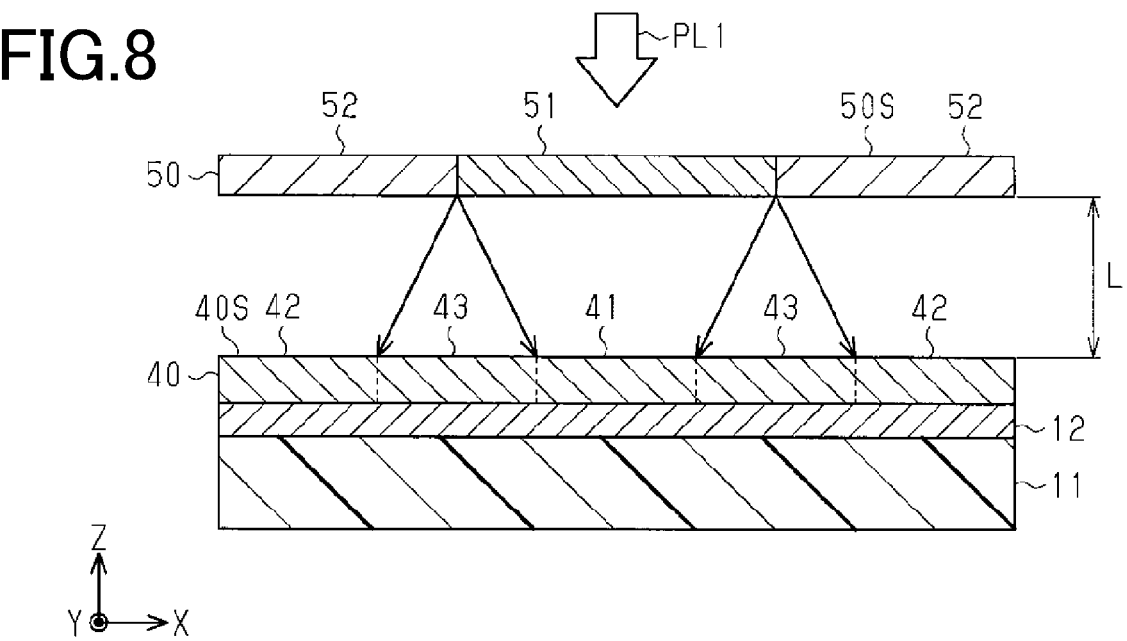
FIG. 8 is a diagram illustrating a step of irradiating the precursor layer with first polarized light in the method of manufacturing the display.

As shown in FIG. 8, the precursor layer 40 is irradiated with first polarized light PL1 through a halftone dot mask 50 for forming a regulation region. The halftone dot mask 50 is an example of the mask, and the first polarized light PL1 is an example of the first light. When the precursor layer 40 is irradiated with the first polarized light PL1, the first polarized light PL1 is applied to the precursor layer 40 in an irradiation direction in which the precursor layer 40 develops a predetermined alignment regulating direction. The irradiation direction is an angle formed between the polarization direction of the first polarized light PL1 and a direction parallel to the surface 40S of the precursor layer 40.

The halftone dot mask 50 includes transmissive parts 51 that transmit the first polarized light PL1, and non-transmissive parts 52 that do not transmit the first polarized light PL1. The halftone dot mask 50 has a surface 50S opposite to a surface facing the precursor layer 40. The transmissive parts 51 correspond to an example of the first mask element for the first regulation region, and the non-transmissive parts 52 correspond to an example of the second mask element for the second regulation region.

When the first polarized light PL1 is applied by using the halftone dot mask 50, among incident angles of the first polarized light PL1, an incident angle, through which the first polarized light PL1 can reach the precursor layer 40 through the transmissive part 51, gradually increases towards a portion closer to the boundary between the non-transmissive part 52 and the transmissive part 51 in the direction from the non-transmissive part 52 toward the transmissive part 51. Therefore, the exposure continuously increases in the precursor layer 40 from a portion facing the non-transmissive part 52 toward a portion facing the boundary between the non-transmissive part 52 and the transmissive part 51.

On the other hand, also in the boundary between the non-transmissive part 52 and the transmissive part 51, the non-transmissive part 52 prevents part of the first polarized light PL1 having an incident angle from reaching the precursor layer 40. Therefore, the exposure in the precursor layer 40 continuously increases from a portion aligning with the boundary between the non-transmissive part 52 and the transmissive part 51 toward a portion aligning with a portion apart from the boundary by a predetermined distance.

Accordingly, by irradiating the precursor layer 40 with the first polarized light PL1 through the halftone dot mask 50, a third precursor region 43 is defined in a portion of the precursor layer 40, the portion being aligned with the boundary between the transmissive part 51 and the non-transmissive part 52, in plan view perpendicular to the surface 40S of the precursor layer 40. Further, in the precursor layer 40, a first precursor region 41 is defined in a portion aligning with the transmissive part 51 and excluding the third precursor region 43, and a second precursor region 42 is defined in a portion aligning with the non-transmissive part 52 and excluding the third precursor region 43.

The distance between the surface 40S of the precursor layer 40 and the surface of the halftone dot mask 50 facing the precursor layer 40 is an exposure distance L. The exposure distance L is preferably in the range of 0 µm or more and 500 µm or less. When the exposure distance L is 0 µm or more, a larger exposure distance L can make the width of the third precursor region 43 larger in the direction in which the first and second precursor regions 41 and 42 are arranged. On the other hand, when the exposure distance L is 500 µm or less, the boundary between the first and second precursor regions 41 and 42 is prevented from becoming unclear. As a result, the image displaced by the display 10 is prevented from blurring.

Figure 9:
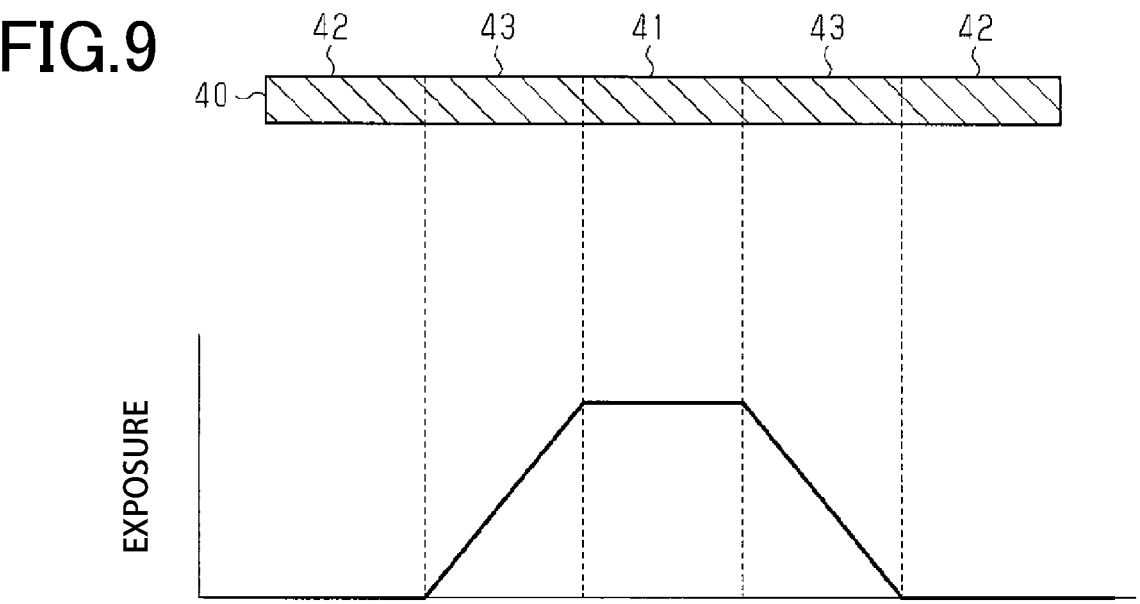
FIG. 9 shows exposure distribution in the precursor layer associated with the precursor layer.

When the first polarized light PL1 is applied using the halftone dot mask 50, the second precursor region 42 of the precursor layer 40 is not irradiated with the first polarized light PL1; thus, has a minimum exposure as shown in FIG. 9. The first precursor region 41 is irradiated with the first polarized light PL1 transmitted through the transmissive part 51; thus, has a maximum exposure. In contrast, the exposure in the third precursor region 43 continuously increases along the X-direction, that is, from the second precursor region 42 toward the first precursor region 41.

The precursor layer 40 has a portion irradiated with the first polarized light PL1, and at least part of the molecules contained in the irradiated portion are anisotropically re-arrayed. Alternatively, a chemical reaction anisotropically progresses in at least part of the molecules contained in the irradiated portion.

The ratio of molecules anisotropically re-arrayed or the ratio of molecules in which the chemical reaction anisotropically progresses in the irradiated portion is determined by the exposure in the irradiated portion. As the exposure becomes higher, the ratio of molecules anisotropically re-arrayed or the ratio of molecules in which the chemical reaction anisotropically progresses becomes higher.

Therefore, in the precursor layer 40, the first precursor region 41 has a maximum ratio of anisotropically re-arrayed molecules or has a maximum ratio of molecules in which the chemical reaction anisotropically progresses, and the second precursor region 42 has a minimum ratio of anisotropically re-arrayed molecules or has a minimum ratio of molecules in which the chemical reaction anisotropically progresses. In the third precursor region 43, the ratio of anisotropically re-arrayed molecules or the ratio of molecules in which the chemical reaction anisotropically progresses gradually increases along a direction from the second precursor region 42 toward the first precursor region 41.

Figure 10:
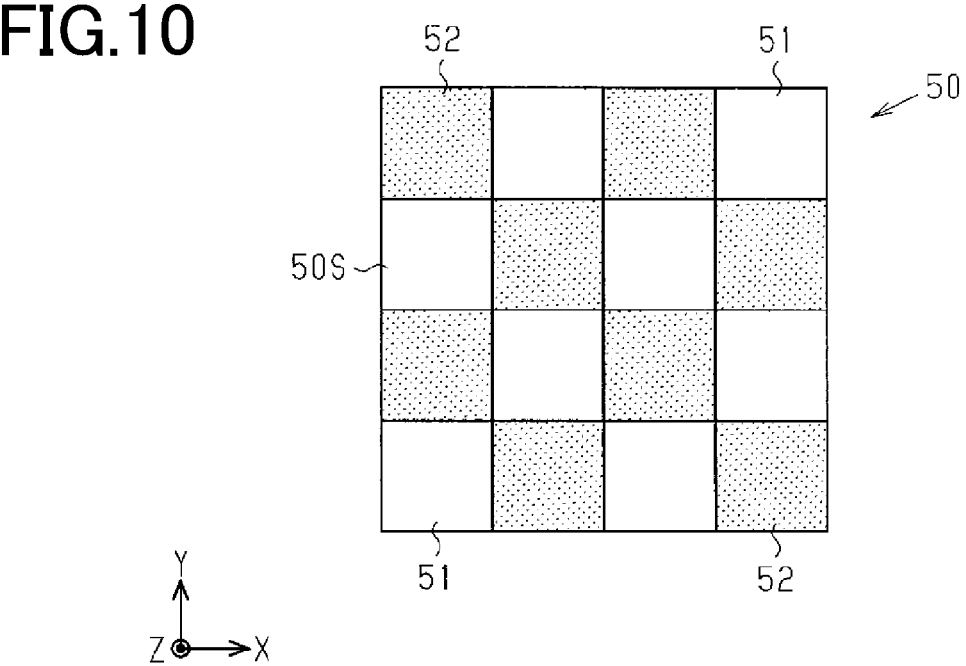
FIG. 10 is a plan view showing a structure of a halftone dot mask used in a step of irradiating the precursor layer with light.

As shown in FIG. 10, in the halftone dot mask 50, the transmissive parts 51 and the non-transmissive parts 52 each have a square shape as viewed in a direction in which the halftone dot mask 50 and the precursor layer 40 are facing. In the halftone dot mask 50, the transmissive parts 51 and the non-transmissive parts 52 are respectively adjacent to each other.

Therefore, when the precursor layer 40 is irradiated with light, the third regulation regions 23 can be formed in all of the portions of the precursor layer 40, the portions aligning with respective portions where a transmissive part 51 is in contact with a non-transmissive part 52, in plan view perpendicular to the surface 50S of the halftone dot mask 50.

When the precursor layer 40 is irradiated with the first polarized light PL1, the first polarized light PL1 is applied to the precursor layer 40 by using part of the halftone dot mask 50.

In plan view perpendicular to the surface 50S of the halftone dot mask 50, all of the transmissive parts 51 have the same size, and all of the non-transmissive parts 52 have the same size, while the size of each transmissive part 51 is the same as that of each non-transmissive part 52 have.

In plan view perpendicular to the surface 50S of the halftone dot mask 50, the transmissive parts 51 and the non-transmissive parts 52 are alternately arrayed along both the X-direction and Y-direction. That is, in plan view perpendicular to the surface 50S of the halftone dot mask 50, the transmissive parts 51 and the non-transmissive parts 52 are arrayed in a checkerboard pattern.

In plan view perpendicular to the surface 50S of the halftone dot mask 50, each non-transmissive part 52 preferably has a length in each of the X- and Y-directions approximately in the range of 2 µm or more and 50 µm or less, and more preferably in the range of 2 µm or more and 20 µm or less. That is, each non-transmissive part 52, when the area thereof is expressed by multiplication of the lengths in the X- and the Y-directions, preferably has an area approximately in the range of 2 µm×2 µm or more and 50 µm×50 µm or less, and more preferably 2 µm×2 µm or more and 20 µm×20 µm or less.

When each non-transmissive part 52 has an area of 2 µm×2 µm or more, the reliability of the formation of the third regulation regions 23 increases. Moreover, when each non-transmissive part 52 has an area of 50 µm×50 µm or less, the ratio of the areas of the third regulation regions 23 with respect to the areas of the first regulation regions 21 and second regulation regions 22 is sufficiently maintained. Therefore, a continuous change is likely to be visually recognized between images respectively displayed by the first and second alignment regions 31 and 32.

Figure 11:
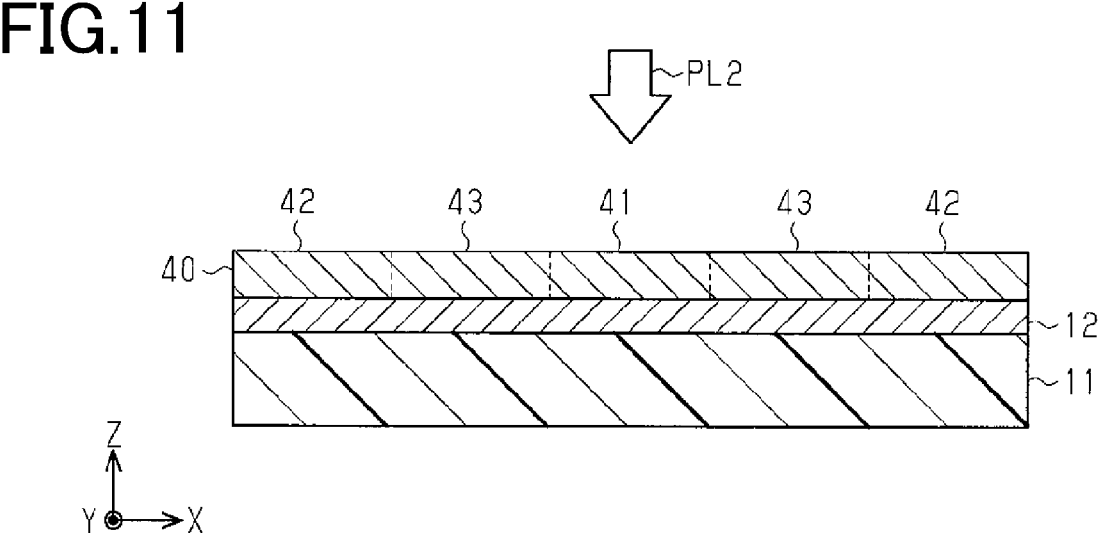
FIG. 11 is a diagram illustrating a step of irradiating the precursor layer with second polarized light in the method of manufacturing the display.

As shown in FIG. 11, the entire precursor layer 40 is irradiated with second polarized light PL2 in an irradiation direction different from that of the first polarized light PL1. Thus, each first precursor region 41 provides one first regulation region 21, each second precursor region 42 provides one second regulation region 22, and each third precursor region 43 provides one third regulation region 23.

Thus, by irradiating the precursor layer 40 having photoreactivity with light, the first regulation regions 21, the second regulation regions 22, and the third regulation regions 23 can be defined in the alignment regulating layer 13. Furthermore, the third regulation regions 23 are each defined only by irradiation with light. Therefore, compared with a configuration in which the alignment regulating layer 13 is formed by other methods, the third regulation regions 23 in which the alignment regulating direction continuously changes can be more easily formed.

The first regulation regions 21 are formed by irradiation with the first polarized light PL1 and the second polarized light PL2. Therefore, the first regulating direction D1 in the first regulation region 21 is determined by the irradiation direction and the intensity of the first polarized light PL1 and the irradiation direction and the intensity of the second polarized light PL2.

The third regulation regions 23 are also formed by irradiation with the first polarized light PL1 and the second polarized light PL2, as with the first regulation regions 21. Therefore, the alignment regulating direction in the third regulation region 23 is determined by the irradiation direction of and intensity of the first polarized light PL1 and the irradiation direction and the intensity of the second polarized light PL2.

In contrast, the second regulation regions 22 are formed by irradiation only with the second polarized light PL2. Therefore, the second regulating direction D2 in the second regulation region 22 is determined by the irradiation direction and the intensity of the second polarized light PL2.

In each first regulation region 21, an angle formed between the first regulating direction D1 and a reference direction parallel to the surface 13S of the alignment regulating layer 13 is a first regulating angle. In the second regulation region 22, an angle formed between the second regulating direction D2 and the reference direction is a second regulating angle.

When the first and second regulating angles are, for example, 45° and 0°, respectively, the irradiation direction of the second polarized light PL2 needs to be an irradiation direction of forming a second regulating angle of 0°. On the other hand, the irradiation direction of the first polarized light PL1 may be an irradiation direction of forming a first regulating angle of 45° by irradiation only with the first polarized light PL1, or may be an irradiation direction of forming a first regulating angle of 45° by irradiation with the first polarized light PL1 and the second polarized light PL2.

For example, when the irradiation direction of the first polarized light PL1 is an irradiation direction of forming a first regulating angle of 45° by irradiation only using the first polarized light PL1, the irradiation direction of the first polarized light PL1 may be an irradiation direction of forming a first regulating angle of 45°. Furthermore, the first polarized light PL1 may only have to have an intensity substantially saturating the reaction of photo-orientated molecules contained in the first precursor region 41.

By irradiation with the second polarized light PL2 in an irradiation direction of forming a second regulating angle of 0°, an alignment regulating layer 13 can be obtained, in which the first regulating angle is 45°, and the second regulating angle is 0°, with the regulating angle in the third regulation region 23 continuously changing between 0° and 45°.

Figure 12:
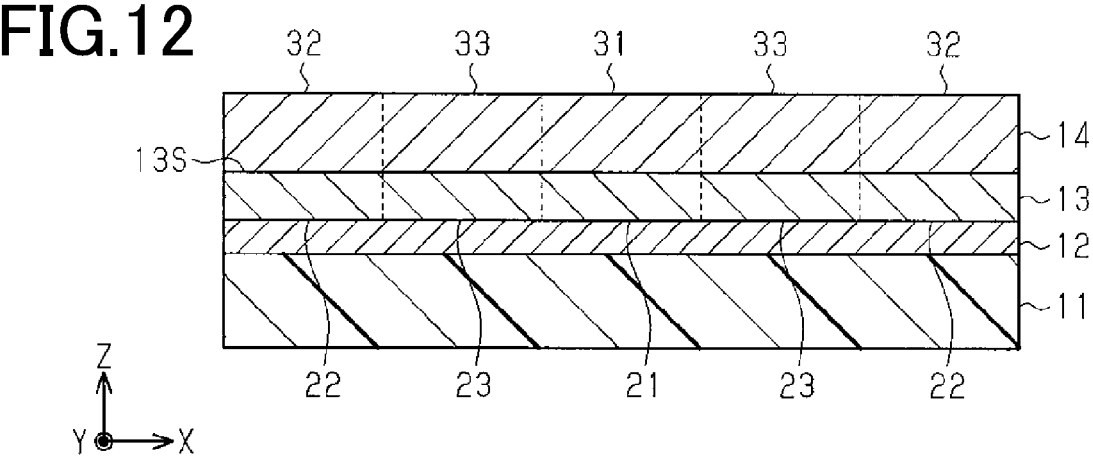
FIG. 12 is a diagram illustrating a step of forming a liquid crystal layer in the method of manufacturing the display.

As shown in FIG. 12, a liquid crystal layer 14 is formed on a surface 13S of the alignment regulating layer 13. When the liquid crystal layer 14 is formed on the alignment regulating layer 13, the liquid crystal molecules contained in the liquid crystal layer 14 are aligned following the alignment regulating direction of the alignment regulating layer 13.

With this configuration, a first alignment region 31 containing liquid crystal molecules aligned along the first regulating direction D1, and a second alignment region 32 containing liquid crystal molecules aligned along the second regulating direction D2 are formed in the liquid crystal layer 14. In the liquid crystal layer 14, a third alignment region 33 is further formed along a direction from the first regulation region 21 toward the second regulation region 22. The third alignment region 33 contains liquid crystal molecules aligned along an alignment regulating direction that continuously changes from the first regulating direction D1 to the second regulating direction D2.

Examples of the forming material of the liquid crystal layer 14 include photocurable liquid crystal monomers having acrylate at both ends of a mesogenic group, polymer liquid crystals cured by irradiation with electron rays or ultraviolet rays, polymer liquid crystals each having a main chain to which a mesogenic group branched from the main chain of the polymer is bound, liquid crystal polymers having main chains aligned along an alignment regulating direction. These photocurable liquid crystal monomers and these three types of polymer liquid crystals are examples of the liquid crystal molecules. The liquid crystal layer 14 may be formed of liquid crystal molecules having thermosetting properties.

When the liquid crystal molecules have active ray curability, that is, ultraviolet ray curability or electron ray curability, the alignment in the liquid crystal layer 14 can be more stabilized by being cured with ultraviolet rays or electron rays. When the liquid crystal molecules have thermosetting properties, the alignment in the liquid crystal layer 14 can be more stabilized by being cured with heat.

Then, a protective layer 15 is formed on the surface of the liquid crystal layer 14 at a side opposite to the surface contacting the alignment regulating layer 13, thereby obtaining the aforementioned display 10 described with reference to FIG. 2. The protective layer 15 is made such as of resin. Specifically, the protective layer 15 may be formed of a thermoplastic resin, a thermosetting resin, or an active-ray curable resin. These resins may be used singly or in combination. The protective layer 15 may be formed such as of an acrylic resin, a urethane resin, a vinyl chloride resin-vinyl acetate copolymer resin, a polyester resin, a melamine resin, an epoxy resin, a polystyrene resin, or a polyimide resin.

[Functions of Display]

With reference to FIGS. 13A, 13B, 13C, 13D, and 13E, the functions of the display will be described.

FIGS. 13A, 13B, 13C, 13D, and 13E each show an image that is displayed by the display 10 through the surface 10S of the display 10 when a polarizing plate is held over the display 10. Each image is a latent image developed by polarized light. For convenience, in FIGS. 13A, 13B, 13C, 13D, and 13E, the images displayed by the display 10 are shown in a state of being aligned with the respective display parts 10a. The following description will be given by way of an example of a display 10 in which the first regulating angle is 45°, and the second regulating angle is 0° in the alignment regulating layer 13.

Figure 13A:
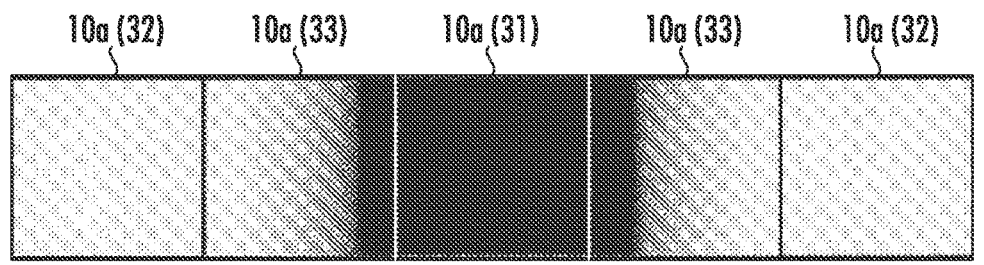
FIGS. 13A, 13B, 13C, 13D, and 13E are diagrams illustrating functions of the display.
Figure 13B:
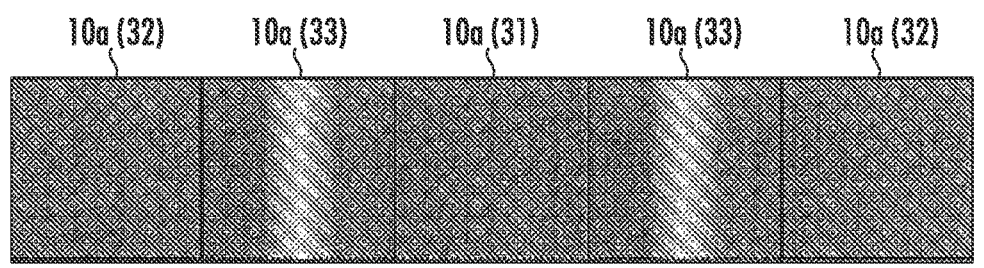
Figure 13C:
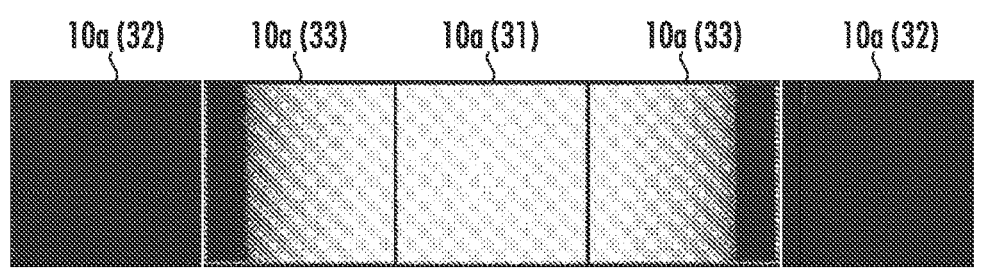
Figure 13D:
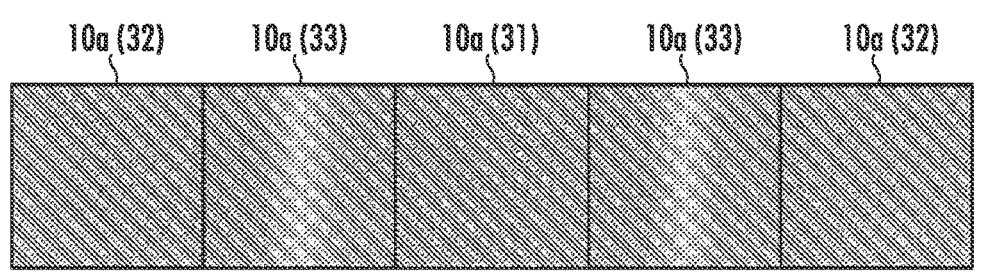
Figure 13E:
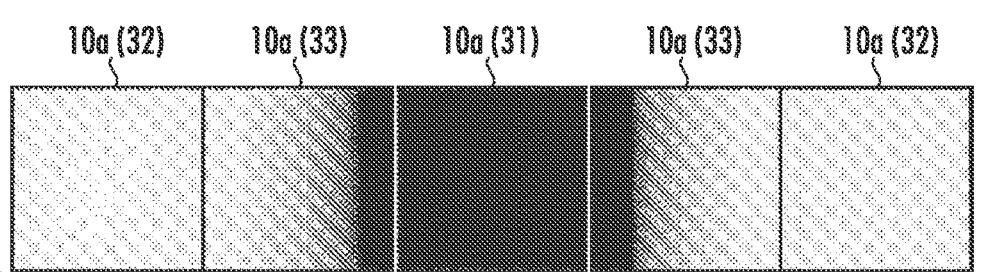

Of FIGS. 13A, 13B, 13C, 13D, and 13E, FIG. 13A shows an image when the angle formed between the reference direction on the X-Y plane and the optical axis of the polarizing plate is 0°, and FIG. 13B shows an image when the angle formed between the reference direction and the optical axis of the polarizing plate is 22.5°. FIG. 13C shows an image when the angle formed between the reference direction and the optical axis of the polarizing plate is 45°, FIG. 13D shows an image when the angle formed between the reference direction and the optical axis of the polarizing plate is 67.5°, and FIG. 13E shows an image when the angle formed between the reference direction and the optical axis of the polarizing plate is 90°.

As shown in FIGS. 13A, 13B, 13C, 13D, and 13E, when the angle formed between the reference direction and the optical axis of the polarizing plate is gradually changed from 0° to 90°, the brightness of the image displayed by the display 10 changes along the X-direction. Furthermore, in the display part 10a including a third alignment region 33 in the image displayed by the display 10, the brightness of the image continuously changes along a direction from the display part 10a including a first alignment region 31 toward the display part 10a including a second alignment region 32.

Thus, in the third alignment region 33 of the liquid crystal layer 14, the alignment direction of the liquid crystal molecules continuously changes between the first and second alignment directions, which are determined by the first and second regulating directions D1 and D2, respectively. Therefore, compared with a configuration in which the alignment direction of the liquid crystal molecules changes only between the first and second alignment directions in between the first and second alignment regions 31 and 32 of the liquid crystal layer 14, changes in visual characteristics are smoothed on the boundary between the adjacent regions in the image displayed by the display 10.

A description will be given of the principles by which the above changes occur in the image displayed by the display 10.

The wavelength of light used for observing the display 10, and the phase difference in the liquid crystal layer 14 are taken to be constant. The angle formed between the optical axis of the polarizing plate held over the display 10, and the optical axis of the liquid crystal layer 14, or, the alignment direction, is indicated by θ, and the contrast in the displayed image is indicated by C. In this case, the contrast C can be represented by the following Equation $$C = \sin 2(2\theta) \qquad \text{Equation (1)}$$

As will be clear from the Equation (1), the contrast C in the image displayed when the polarizing plate is aligned with the display 10 has the maximum value when the angle θ is 0° and 45° in the range of angle θ from 0° to 90°. The contrast C has a value according to the Equation (1) when the angle θ is in the range of 0° to 45° and in the range of 45° to 90°. Therefore, when the polarizing plate is held over the display 10, portions of the liquid crystal layer 14 are visually recognized to have different brightness due to the difference in the angle θ in these portions.

Moreover, when the display 10 is observed with the polarizing plate being turned around an axis parallel to the direction in which the display 10 aligns with the polarizing plate, the angle θ continuously changes. Therefore, portions with low brightness are visually recognized to be moving in the image displayed by the display 10.

In FIG. 13A, the optical axis of the polarizing plate and the optical axis of the second alignment region 32 are parallel to each other. Therefore, polarized light incident on the second alignment region 32 through the polarizing plate can pass through the second alignment region 32. Accordingly, in the image displayed by the display 10, a portion aligning with the second alignment region 32 has the maximum brightness in the image displayed by the display 10.

In contrast, since the angle formed between the optical axis of the polarizing plate and the optical axis of the first alignment region 31 is 45°, polarized light incident on the first alignment region 31 through the polarizing plate is rotated by 90° by the first alignment region 31. Accordingly, in the image displayed by the display 10, a portion aligning with the first alignment region 31 has the lowest brightness in the image.

In the third alignment region 33, the angle formed between the optical axis of the polarizing plate and the optical axis of the third alignment region 33 continuously increases from 0 to 45° along a direction from the second alignment region 32 toward the first alignment region 31. Therefore, in the image displayed by the display 10, the brightness of a portion aligning with the third alignment region 33 continuously decreases along a direction from the second alignment region 32 toward the first alignment region 31.

In each of FIGS. 13B, 13C, 13D, and 13E, the image displayed in the display 10 has a maximum brightness at a portion aligning with a portion of the liquid crystal layer 14 where the optical axis of the polarizing plate is parallel to the optical axis of the liquid crystal layer 14. On the other hand, the image displayed in the display 10 has a minimum brightness at a portion aligning with a portion of the liquid crystal layer 14 where the angle formed between the optical axis of the polarizing plate and the optical axis of the liquid crystal layer 14 is 45°. Moreover, the image displayed in the display 10 has the contrast C according to the Equation (1) set forth above, at a portion aligning with a portion of the liquid crystal layer 14 where the angle formed between the optical axis of the polarizing plate and the optical axis of the liquid crystal layer 14 is within the range of 0° to 45°.

When the polarizing plate, while being held over the display 10, is turned around an axis that is parallel to the direction in which the display 10 aligns with the polarizing plate, the authenticity of the display 10 can be determined by whether the portion with low brightness shows a predetermined movement in the image displayed in the display 10. Moreover, the authenticity of an article provided with the display 10 can be determined by determining the authenticity of the display 10. The authenticity determination using the display 10 may be made by visual observation, or may be made using a device that can analyze brightness of the image displayed in the display 10.

The display 10 may be a predetermined shape in plan view perpendicular to the surface 10S of the display 10. The display 10 may have a linear, circular, elliptic, polygonal, or free curved shape, or other shapes. Examples of the free curved shape include marks, characters, logos, and the like.

Examples of the movement shown in a portion with low brightness in each shape of the display 10 include radial movement from the center toward the outer edge, movement in the opposite direction (i.e., radial movement from the outer edge toward the center), rotating movement, and linear movement (i.e., sweeping).

The display 10 may be made up of a plurality of shape elements. In this case, each shape element may be configured such that a portion with low brightness therein shows a movement. The movement shown in a portion with low brightness in each of the plurality of shape elements may interlock between the plurality of shape elements. The interlocking movement may be synchronized movement, alternating movement, linked movement, or the like.

The polarizing plate used for observing the display 10 may have the following configuration.

Specifically, the polarizing plate may be, for example, an absorption-type polarizer. The absorption-type polarizer can be formed by impregnating PVA with iodine or a dichromatic dye, followed by stretching the PVA to thereby align the iodine or the dichromatic dye. Alternatively, the absorption-type polarizer can be formed by aligning a dichromatic dye on an alignment film.

Any element may be used as the polarizing plate as long as the element can separate or extract a specific polarization component from transmitted light.

The polarizing plate may be a wire grid polarizer. The wire grid polarizer has a concavo-convex structure made of a resin, and a conductor covering at least convexities of the uneven surface of the concavo-convex structure. In the concavo-convex structure, convexities and concavities extending unidirectionally and linearly are alternately arrayed. Such a wire grid polarizer reflects linearly polarized light that is parallel to the extending direction of the conductor, and transmits linearly polarized light that is orthogonal to the extending direction of the conductor, as with a structure in which a plurality of conductors each having a linear shape is arrayed.

EXAMPLE

A polyethylene terephthalate film was prepared as a substrate, followed by forming an aluminum layer having a thickness of 50 nm as a reflective layer by vacuum deposition over the entire surface of the substrate. The entire surface of the reflective layer was coated with a photo-alignment agent (LIA-01, produced by DIC) with a thickness of 0.1 µm by a bar-coater, followed by drying the photo-alignment agent, thereby forming a precursor layer having a thickness of 30 nm.

Subsequently, a halftone dot mask having transmissive parts and non-transmissive parts arrayed in a checkerboard pattern was prepared. Then, the precursor layer was irradiated with first polarized light, with the halftone dot mask being in close contact with the surface thereof. The first polarized light was applied to the precursor layer in an irradiation direction of forming a first regulating angle of 45°. Then, the halftone dot mask was removed from the surface of the precursor layer, followed by irradiating the entire precursor layer with second polarized light. The second polarized light was applied to the precursor layer in an irradiation direction of forming a second regulating angle of 0°. Thus, an alignment regulating layer having first regulation regions, second regulation regions, and third regulation regions was obtained.

The surface of the alignment regulating layer was coated with a UV-curable liquid crystal (UCL-008, manufactured by DIC) by microgravure coating, followed by irradiating the coated film with non-polarized ultraviolet rays, for curing. Thus, an alignment regulating layer having first regulation regions, second regulation regions, and third regulation regions was obtained.

An acrylic resin was applied with a thickness of 1 µm to the surface of the liquid crystal layer by a microgravure coating, followed by drying the acrylic resin at 100° C. to form a protective layer. Thus, a display was obtained.

The image displayed in the display was observed with a polarizing plate being held over the display, and being turned around an axis extending in the direction parallel to the direction in which the display aligns with the polarizing plate. Thus, as described with reference to FIGS. 13A, 13B, 13C, 13D, and 13E, it was recognized that the latent image in the display was developed, and that the position of a portion with the lowest brightness in the image displayed in the display changed with the turning of the polarizing plate. It was also recognized that the brightness continuously changed in the image between a portion with high brightness and a portion with low brightness.

As described above, the following advantageous effects can be obtained according to the first embodiment of the display and the method of manufacturing the display.

(1) Compared with a configuration in which the alignment direction of the liquid crystal molecules changes only between the first alignment direction and the second alignment direction between the first alignment region 31 and the second alignment region 32 of the liquid crystal layer 14, changes in visual characteristics are smoothed on the boundary between the adjacent regions of the image displayed in the display 10.

(2) The substrate 11 made of a resin is not directly contacting the alignment regulating layer 13; thus, the alignment regulating direction of the alignment regulating layer 13 is less likely to be affected by the stretching direction of the substrate 11. Therefore, the degree of freedom of the method of manufacturing the substrate 11 increases.

(3) The first regulation region 21, the second regulation region 22, and the third regulation region 23 are defined in the alignment regulating layer 13 by irradiating the precursor layer 40, which has photoreactivity, with light. Furthermore, the third regulation region 23 is defined only by irradiation with light. Therefore, compared with a configuration in which the alignment regulating layer 13 is formed by other methods, the third regulation regions 23 in which the alignment regulating direction continuously changes can be more easily formed.

(4) When the precursor layer 40 is irradiated with light, the third regulation region 23 can be formed in all of the portions on the precursor layer 40, the portions aligning with the respective portions where a transmissive part 51 is in contact with a non-transmissive part 52, in plan view perpendicular to the surface 50S of the halftone dot mask 50.

[Modification of First Embodiment]

The first embodiment described above may be appropriately modified as below.

The halftone dot mask 50 may have a configuration in which the transmissive parts 51 and the non-transmissive parts 52 are adjacent to each other only along the X-direction. Such a configuration can also achieve advantageous effects similar to (1) set forth above.

In plan view perpendicular to the surface 50S of the halftone dot mask 50, each transmissive part 51 and each non-transmissive part 52 may have a rectangular shape, and the shape may be different between transmissive parts 51 and the non-transmissive parts 52. Moreover, the halftone dot mask 50 may be configured to have a plurality of transmissive parts with non-transmissive parts each being fitted therebetween, in plan view perpendicular to the surface 50S of the halftone dot mask 50. In the halftone dot mask 50, a plurality of transmissive parts is arrayed. Alternatively, the halftone dot mask 50 may be configured to have a plurality of non-transmissive parts and a transmissive part that fills in between the plurality of non-transmissive parts, in plan view perpendicular to the surface 50S of the halftone dot mask 50. In the halftone mask 50, the plurality of non-transmissive parts may be arrayed.

Figure 14:
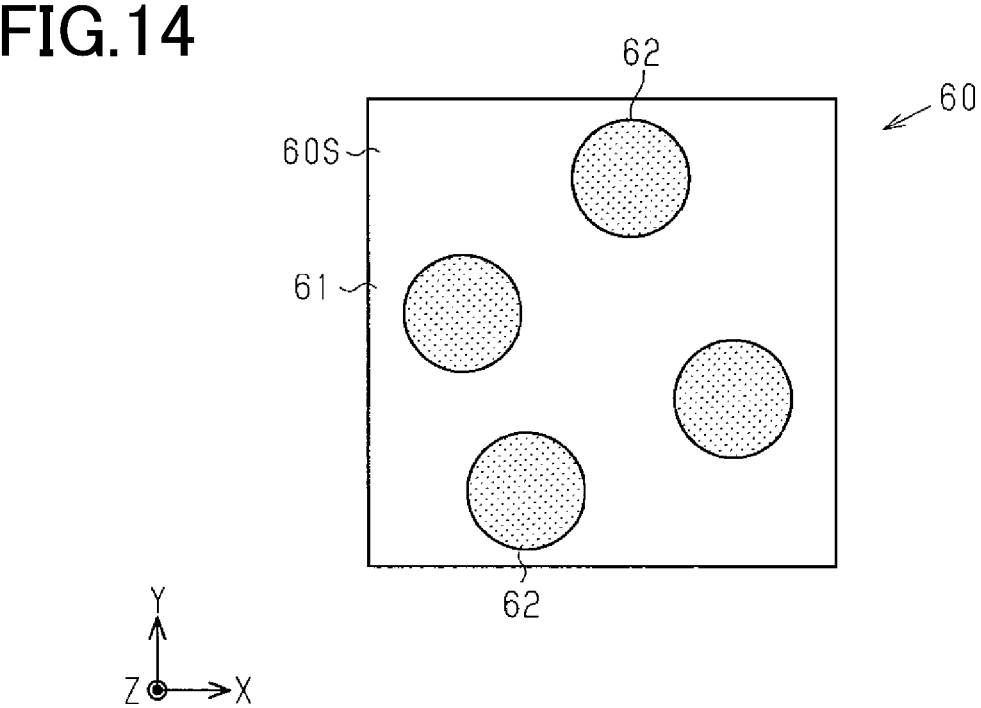
FIG. 14 is a plan view showing a structure of a halftone dot mask according to a modification of the first embodiment.

As shown in FIG. 14, in plan view perpendicular to a surface 60S of a halftone dot mask 60, a plurality of non-transmissive parts 62 may each have a circular shape, and may be irregularly arranged on the surface 60S of the halftone dot mask 60. The halftone dot mask 60 may have a transmissive part 61 that is provided in so as to fill in between the plurality of non-transmissive parts 62. With this halftone dot mask 60 as well, the intensity of light applied to the precursor layer 40 through the halftone dot mask 60 continuously changes in a portion including the boundary between each non-transmissive part 62 and the transmissive part 61, as with the halftone dot mask 50. Therefore, advantageous effects similar to (1) set forth above can be achieved.

The mask used for irradiating the precursor layer 40 with light may be configured to have a plurality of transmissive parts and a plurality of non-transmissive parts. In this mask, the transmissive parts and the non-transmissive parts may be unidirectionally extended and alternated along a direction orthogonal to the extension direction. With such a mask, the intensity of light applied to the precursor layer 40 through the mask continuously changes in a portion including the boundary between a transmissive part and a non-transmissive part, as with the halftone dot mask 50. Therefore, such a mask can still achieve advantageous effects similar to (1) set forth above.

The halftone dot mask 50 may have a first mask element that transmits part of the first polarized light PL1, as the second mask element having transmissivity lower than that of the first mask element. Such a configuration can still achieve advantageous effects similar to (1) set forth above, because the intensity of light applied to the precursor layer 40 through the halftone dot mask 50 continuously changes in a portion including the boundary between a first mask element and a second mask element.

A mask may also be used when irradiating the precursor layer 40 with the second polarized light PL2. In this case, the second polarized light PL2 may be applied by using a mask in which the transmissive parts 51 and the position of the non-transmissive parts 52 are reversely provided in comparison with the halftone dot mask 50. When applying the second polarized light, this mask is located at the same position as the position of the halftone dot mask 50 relative to the precursor layer 40. Such a configuration can still form the alignment regulating layer 13 having the third regulation region 23; thus, advantageous effects similar to (1) set forth above can be achieved.

The display 10 may have an anchor layer provided between the reflective layer 12 and the alignment regulating layer 13. Such a configuration can prevent the alignment regulating layer 13 from begin peeled off from the layer contacting the alignment regulating layer 13, as compared with a configuration in which the reflective layer 12 directly contacts the alignment regulating layer 13.

The anchor layer mentioned above may be provided between the substrate 11 and the reflective layer 12. Alternatively, a layer, which is a layer other than the anchor layer and having light transmissivity, may be provided between the substrate 11 and the reflective layer 12.

The reflective layer 12 may be provided on the back surface 11R of the substrate 11, and the alignment regulating layer 13 may be provided on the front surface 11S of the substrate 11. However, as described above, when the substrate 11 is an oriented film, the alignment regulating direction of the alignment regulating layer 13 is affected by the stretching direction of the oriented film. Therefore, when the alignment regulating layer 13 is directly in contact with the substrate 11, the substrate 11 is preferably a non-oriented film. In such a configuration, the substrate 11 preferably has a light transmissive part at a portion aligning with at least the reflective layer 12 in the thickness direction of the display 10, and the light transmissive part preferably has transparency.

Even in a configuration in which the reflective layer 12 is provided on the back surface 11R of the substrate 11, as long as another layer, such as an anchor layer mentioned above, is provided between the substrate 11 and the alignment regulating layer 13, the alignment direction of the molecules in the alignment regulating layer 13 is less likely to be affected by the substrate 11 because the alignment regulating layer 13 is not in direct contact with the substrate 11. Therefore, in such a configuration, an oriented film may be used as the substrate 11.

The forming material of the substrate 11 is not limited to the resins mentioned above, but may be an inorganic material, such as glass or metal.

The alignment regulating layer 13 may be formed so as to have a predetermined alignment regulating direction by rubbing or vacuum oblique vapor deposition. Alternatively, the alignment regulating layer 13 may be formed so as to have a surface having a groove for regulating the alignment of the liquid crystal molecules. Even if the alignment regulating layer 13 is not a layer formed by irradiation with light, advantageous effects similar to (1) set forth above can be achieved as long as the alignment regulating layer 13 has the first regulation regions, the second regulation regions, and the third regulation regions.

In plan view perpendicular to the surface 10S of the display 10, the first and second regulation regions 21 and 22 may alternately be arrayed along both the X- and Y-directions. Moreover, in plan view perpendicular to the surface 10S of the display 10, the second regulation regions 22 may be provided so as to surround the first regulation region 21, or the first regulation regions 21 may be provided so as to surround the second regulation region 22. With such a configuration, advantageous effects similar to (1) set forth above can be achieved as long as the third regulation region 23 is provided between the first regulation region 21 and the second regulation region 22 so as to fill in between these regions.

The display 10 does not necessarily have to include the protective layer 15. Such a configuration can still achieve advantageous effects similar to (1) set forth above as long as the display 10 includes the alignment regulating layer 13 and the liquid crystal layer 14.

The liquid crystal layer 14 may contain a dichroic dye or a fluorescent dichroic dye. In such a configuration, the dichroic dye or fluorescent dichroic dye may be aligned in a predetermined direction by aligning the liquid crystal molecules contained in the liquid crystal layer 14 in the predetermined direction. Among these, in a configuration in which the liquid crystal layer 14 contains a fluorescent dichroic dye, a moving image by fluorescence can be displayed in the display 10 by turning the display around an axis, which is the direction normal to the surface 10S of the display 10, while irradiating the display 10 with polarized ultraviolet rays. In other words, a portion that emits fluorescence can be changed in the image displayed by the display 10.

The display 10 may have a pressure-sensitive adhesive layer or an adhesive layer on the back surface 11R of the substrate 11. That is, a label that can be attached to other articles can be formed using the display 10.

Examples of the forming material of the pressure-sensitive adhesive layer include vinyl chloride-vinyl acetate copolymers, polyester-based polyamide, and binders, such as acrylic-based binders, butyl rubber-based binders, natural rubber-based binders, silicon-based binders, and polyisobutyl-based binders. Other examples of the forming material of the pressure-sensitive adhesive layer include materials containing any of these binders, and additives such as aggregation components, modifying components, polymerization initiators, plasticizers, curing agents, curing accelerators, and antioxidants.

Among these, examples of aggregation components include alkyl methacrylate, vinyl ester, acrylonitrile, styrene, vinyl monomers, and the like; and examples of modifying components include unsaturated carboxylic acid, hydroxyl group-containing monomers, acrylonitrile, and the like.

The pressure-sensitive adhesive layer can be formed by printing such as gravure printing, offset printing, or screen printing, or coating such as bar coating, gravure coating, or roll coating. Moreover, the pressure-sensitive adhesive layer can be formed on the display 10 by previously forming the pressure-sensitive adhesive layer on a separator, and removing the separator while the pressure-sensitive adhesive layer is bonded together with the display 10.

In order to facilitate the handling of the display having a pressure-sensitive adhesive layer, release paper or a release film, which has been subjected to release treatment, may be provided on the surface of the pressure-sensitive adhesive layer at a side opposite to the surface contacting the substrate 11.

Labels with the display 10 can be attached to articles, such as printed materials. When the display 10 is attached to an article, the substrate 11 preferably has a notch or perforation. According to such a configuration, when the label attached to the article is removed, it is highly possible that the substrate 11 may be broken from the notch or perforation of the substrate 11; thus, the label is less likely to be replaced.

A transfer foil with the display 10 may be formed. The display 10 may be attached to an article using the transfer foil.

The display 10 may be blended into paper as a thread, namely, a strip, a filament, a yarn-like material, or a safe strip.

The display 10, which enables the determination of the authenticity of articles, may be used not only for preventing counterfeiting of articles, but also for decorating articles provided with the display 10, or enjoying the display 10 itself.

Second Embodiment

With reference to FIGS. 15 to 19, the display and the method of manufacturing the display according to the second embodiment of the present invention will be described below. The second embodiment is different from the first embodiment described above in terms of the configuration of the third regulation region provided in the alignment regulating layer, and the configuration of the third alignment region provided in the liquid crystal layer. The following description refers to such a difference in detail, and omits a detailed description of configuration that is common to the configuration of the first embodiment by reference to the configuration with identical reference signs. In the following description, a configuration of the display, the method of manufacturing the display, and functions of the display will be individually described.

[Configuration of Display]

Figure 15:
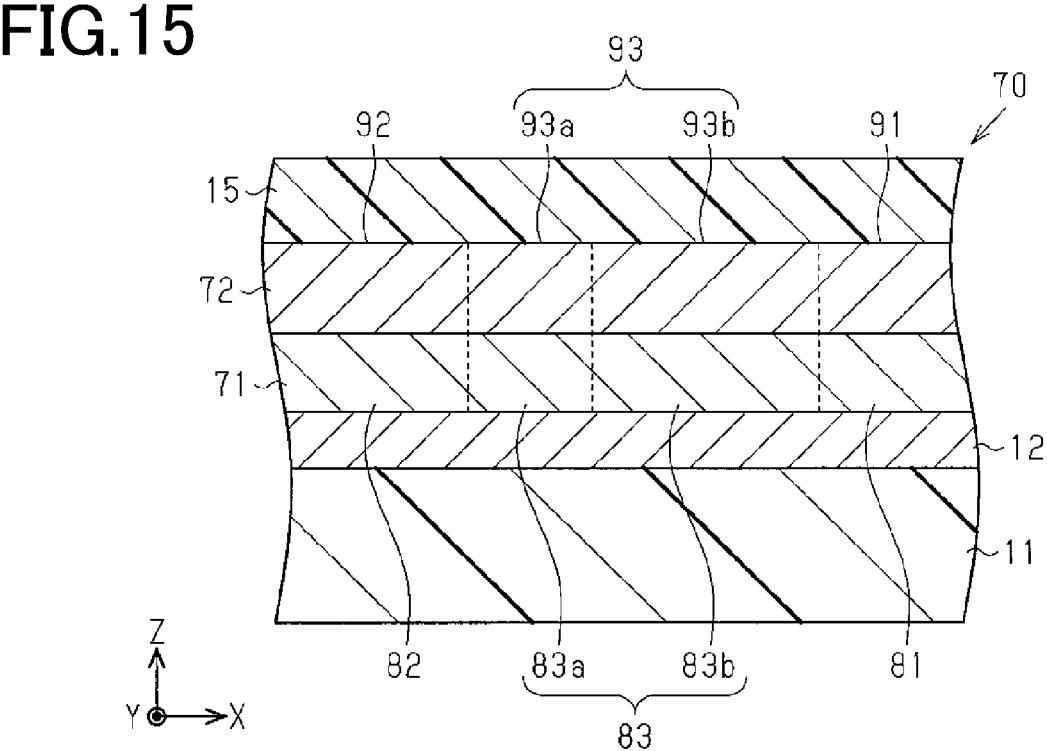
FIG. 15 is a partial cross-sectional view showing a structure of the display according to a second embodiment of the present invention.

With reference to FIG. 15, the configuration of the display will be described.

As shown in FIG. 15, a display 70 includes an alignment regulating layer 71 and a liquid crystal layer 72 contacting the alignment regulating layer 71.

The alignment regulating layer 71 includes a first regulation region 81, a second regulation region 82, and a third regulation region 83. The first regulation region 81 corresponds to the first regulation region 21 of the first embodiment, and the second regulation region 82 corresponds to the second regulation region 22 of the first embodiment.

In the alignment regulating layer 71, the third regulation region 83 is provided between the first regulation region 81 and the second regulation region 82, and includes a first element 83a and a second element 83b. Of the third regulation region 83, the first element 83a is in contact with the second regulation region 82, and the second element 83b is in contact with the first regulation region 81. The first element 83a is a portion in which the alignment regulating direction continuously changes from the first regulating direction to the second regulating direction from a portion contacting the second element 83b toward a portion contacting the second regulation region 82. In contrast, the second element 83b is a portion in which the alignment regulating direction is constant in the X-direction.

The liquid crystal layer 72 includes a first alignment region 91, a second alignment region 92, and a third alignment region 93. The first alignment region 91 corresponds to the first alignment region 31 of the first embodiment, and the second alignment region 92 corresponds to the second alignment region 32 of the first embodiment.

The third alignment region 93, which is at least part of the liquid crystal layer 72, and is contacting the third regulation region 83, includes a first element 93a and a second element 93b. The first element 93a of the third alignment region 93 is a portion contacting the first element 83a of the third regulation region 83, and the second element 93b of the third alignment region 93 is a portion contacting the second element 83b of the third regulation region 83.

[Method of Manufacturing Display]

With reference to FIGS. 16 to 19, the method of manufacturing the display will be described. The method of manufacturing the display of the second embodiment is the same as the method of manufacturing the display of the first embodiment, except for the step of irradiating the precursor layer with the first polarized light. The following description refers to only the step of irradiating the precursor layer with the first polarized light in the method of manufacturing the display.

Figure 16:
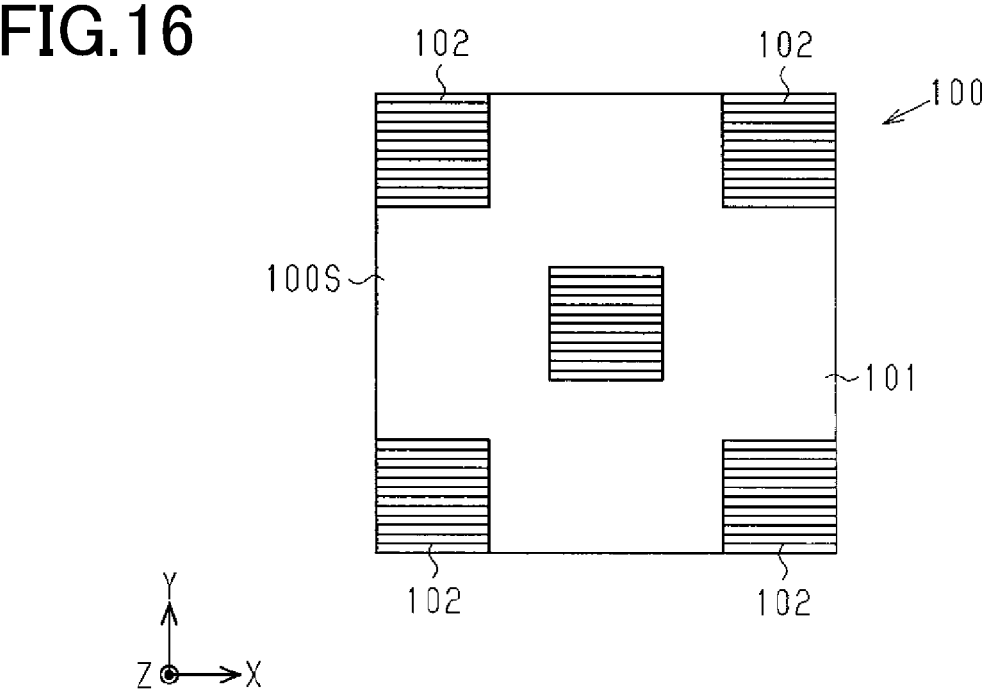
FIG. 16 is a plan view showing a structure of a halftone dot mask used in a step of irradiating a precursor layer with first polarized light in a method of manufacturing a display according to a second embodiment of the present invention.

As shown in FIG. 16, a halftone dot mask 100 includes a plurality of diffraction parts 102, and a transmissive part 101 fitted between the plurality of diffraction parts 102, in plan view perpendicular to the surface 100S of the halftone dot mask 100. The light transmissivity of the transmissive part 101 is higher than that of the diffraction parts 102.

Figure 17:
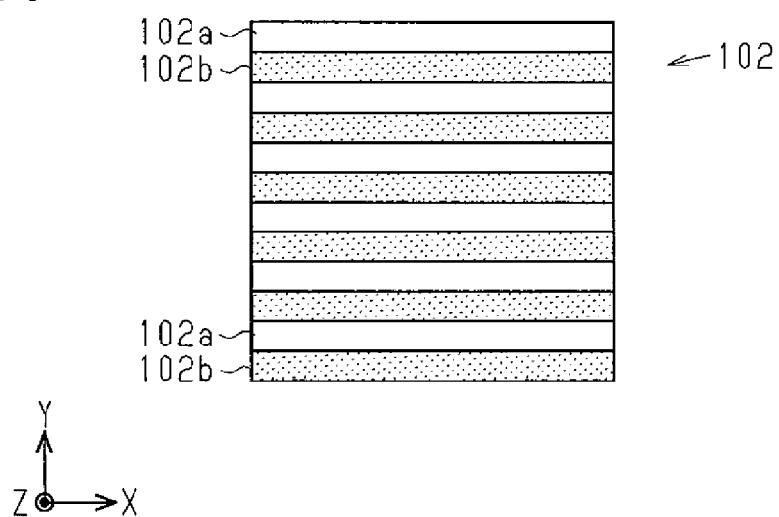
FIG. 17 is an enlarged plan view showing a structure of a diffraction part in the halftone dot mask.

As shown in FIG. 17, each diffraction part 102 includes a plurality of transmissive parts 102a and a plurality of non-transmissive parts 102b. In plan view perpendicular to the surface 100S of the halftone dot mask 100, each transmissive part 102a and each non-transmissive part 102b have a linear shape extending along the X-direction, and the transmissive parts 102a and the non-transmissive parts 102b are alternately arranged along the Y-direction.

Each diffraction part 102 is a transmission-type diffraction grating, and transmits part of light incident on the diffraction part 102, while diffracting the rest of the light incident on the diffraction part 102. The diffraction part 102 emits part of the light incident on the diffraction part 102 as diffracted light to the Y-Z plane.

Figure 18:
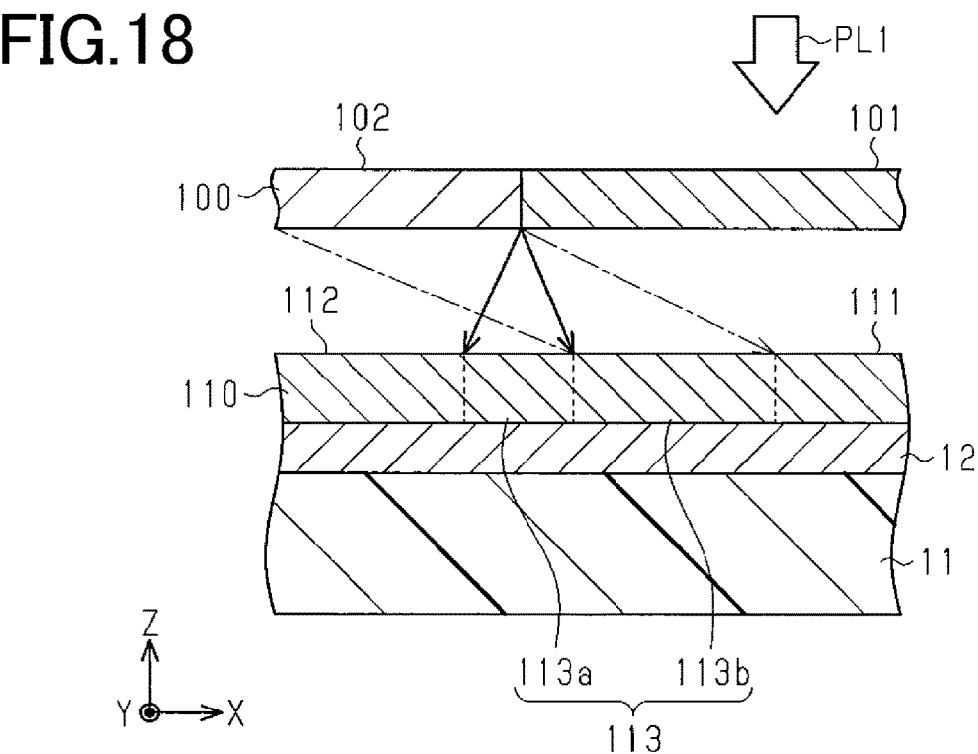
FIG. 18 is a diagram illustrating a step of irradiating the precursor layer with the first polarized light in the method of manufacturing the display.

As shown in FIG. 18, when the first polarized light PL1 is applied by using the halftone dot mask 100, the exposure increases from the diffraction part 102 toward the transmissive part 101 in a portion of a precursor layer 110 which is aligned with a portion including the boundary between the diffraction part 102 and the transmissive part 101.

Moreover, when the first polarized light PL1 is applied by using the halftone dot mask 100, the diffraction part 102 transmits part of the first polarized light PL1 incident on the diffraction part 102 toward the precursor layer 110. In addition, the diffraction part 102 diffracts the first polarized light PL1 entering the diffraction part 102, and emits the diffracted light toward a portion of the precursor layer 110 different from a portion irradiated with light going straight through the diffraction part 102. Moreover, the diffraction part 102 is configured to apply the diffracted light to a portion of the precursor layer 110 which does not align with a portion in which the intensity of the first polarized light PL1 reaching the precursor layer 110 continuously increases.

With this configuration, in plan view perpendicular to the surface 100S of the halftone dot mask 100, a first element 113a of a third precursor region 113 is defined in a portion of the precursor layer 110 aligning with a portion including the boundary between the diffraction part 102 and the transmissive part 101. In the precursor layer 110, a second element 113b of the third precursor region 113 is defined in a portion aligning with the transmissive part 101, and being irradiated with light passing through the transmissive part 101 and the diffracted light emitted from the diffraction part 102. Then, in the precursor layer 110, a second precursor region 112 which is not irradiated with diffracted light is defined in a portion aligning with the diffraction part 102, and a first precursor region 111 is defined in a portion aligning with the transmissive part 101.

Figure 19:
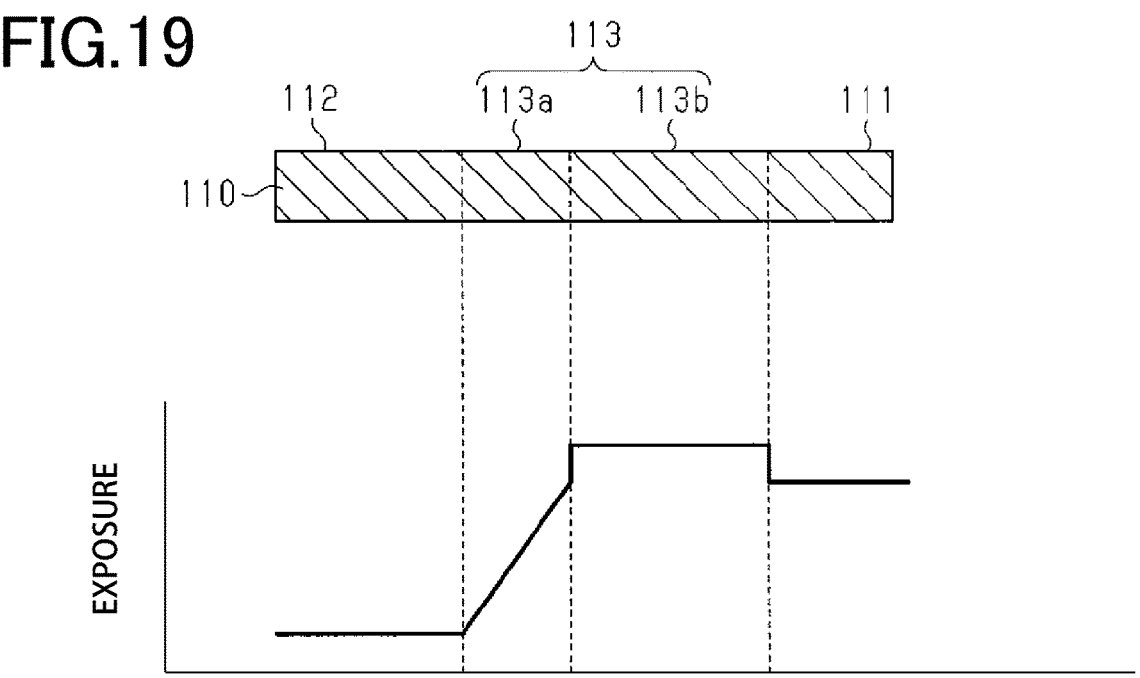
FIG. 19 shows exposure distribution in the precursor layer associated with the precursor layer.

As shown in FIG. 19, the second precursor region 112 is only irradiated with light passing through the diffraction part 102; thus, the exposure of the second precursor region 112 is lowest in the precursor layer 110. In the first element 113a of the third precursor region 113, the exposure of the first element 113a gradually increases along a direction from the second precursor region 112 toward the first precursor region 111.

On the other hand, the second element 113b of the third precursor region 113 is irradiated with both the first polarized light PL1 passing through the transmissive part 101 and the diffracted light emitted from the diffraction part 102; thus, the exposure of the second element 113b is highest in the precursor layer 110. The exposure of the first precursor region 111 to the diffracted light is lower than that of the second element 113b of the third precursor region 113.

As described above, the second polarized light PL2 is applied to the entire precursor layer 110. Therefore, the distribution of the alignment regulating direction in the precursor layer 110 is maintained in the alignment regulating layer 71 of the display 70.

[Functions of Display]

The functions of the display 70 will be described.

In the display 70, the alignment regulating layer 71 includes the first element 83a and the second element 83b as the third regulation region 83. The alignment regulating direction in the first element 83a continuously changes from the first regulating direction to the second regulating direction from a portion contacting the second element 83b toward a portion contacting the second regulation region 82.

Therefore, with the display 70, in the first element 93a of the third alignment region 93, or the portion between the second alignment region 92 and the second element 93b of the third alignment region 93, changes in visual characteristics can be smoothed on the boundary between the adjacent regions in the image displayed in each region.

[Modification of Second Embodiment]

The second embodiment described above may be appropriately modified as below.

Figure 20:
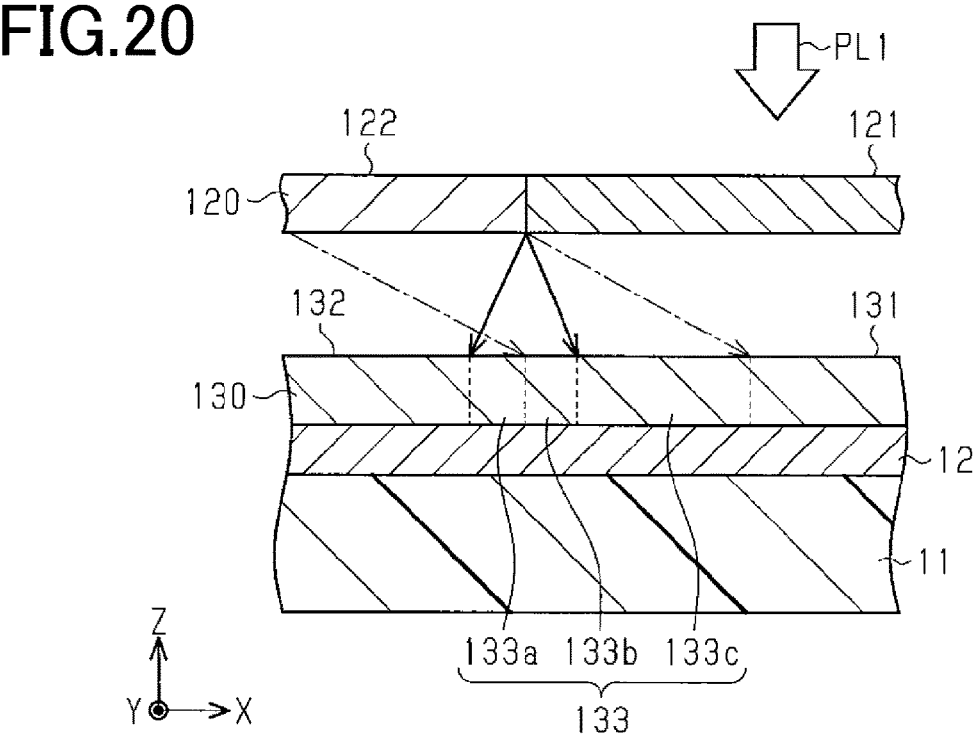
FIG. 20 is a diagram illustrating a step of irradiating the precursor layer with first polarized light, according to a modification of the second embodiment.

As shown in FIG. 20, a diffraction part 122 of a halftone dot mask 120 may be configured to emit diffracted light toward a precursor layer 130 so as to align with part of the first polarized light PL1 applied from a portion of the precursor layer 130 including the boundary between a transmissive part 121 and the diffraction part 122 toward the precursor layer 130.

When the halftone dot mask 120 has such a configuration, in the precursor layer 130 that has been irradiated with the first polarized light PL1, a first precursor region 131 that has been irradiated only with light passing through the transmissive part 121, and a second precursor region 132 that has been irradiated only with light passing through the diffraction part 122. Further, in the precursor layer 130 that has been irradiated with the first polarized light PL1, a third precursor region 133 including a first element 133a, a second element 133b, and a third element 133c is defined.

Among these, the first element 133a is a region irradiated with light from a portion including the boundary between the transmissive part 121 and the diffraction part 122, and the second element 133b is a region irradiated with light from a portion including the boundary between the transmissive part 121 and the diffraction part 122, and the diffracted light. The third element 133c is a region irradiated with the diffracted light and light passing through the transmissive part 121.

Figure 21:
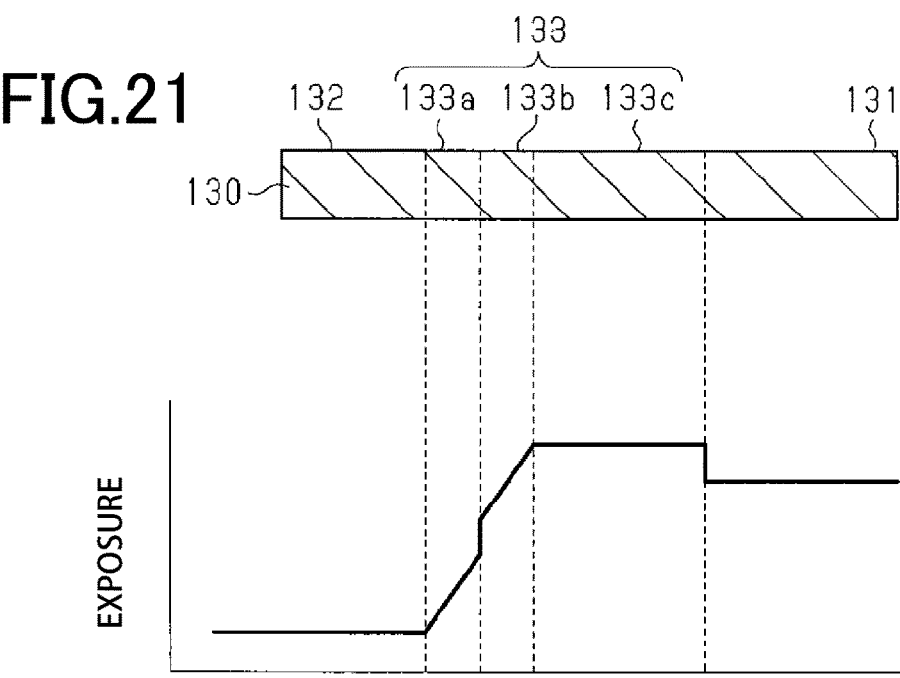
FIG. 21 is a diagram showing exposure distribution in the precursor layer associated with the precursor layer.

Therefore, as shown in FIG. 21, the third element 133c of the third precursor region 133 has the maximum exposure, and the first precursor region 131 has the second highest exposure, and the second precursor region 132 has the minimum exposure.

In each of the first element 133a and the second element 133b of the third precursor region 133, the exposure continuously increases along a direction from the second precursor region 132 toward the first precursor region 131; thus, the alignment regulating direction continuously changes.

Therefore, in portions of the liquid crystal layer contacting the first element 133a and the second element 133b, the alignment direction continuously changes along a direction from the second precursor region 132 toward the first precursor region 131.

Figure 22:
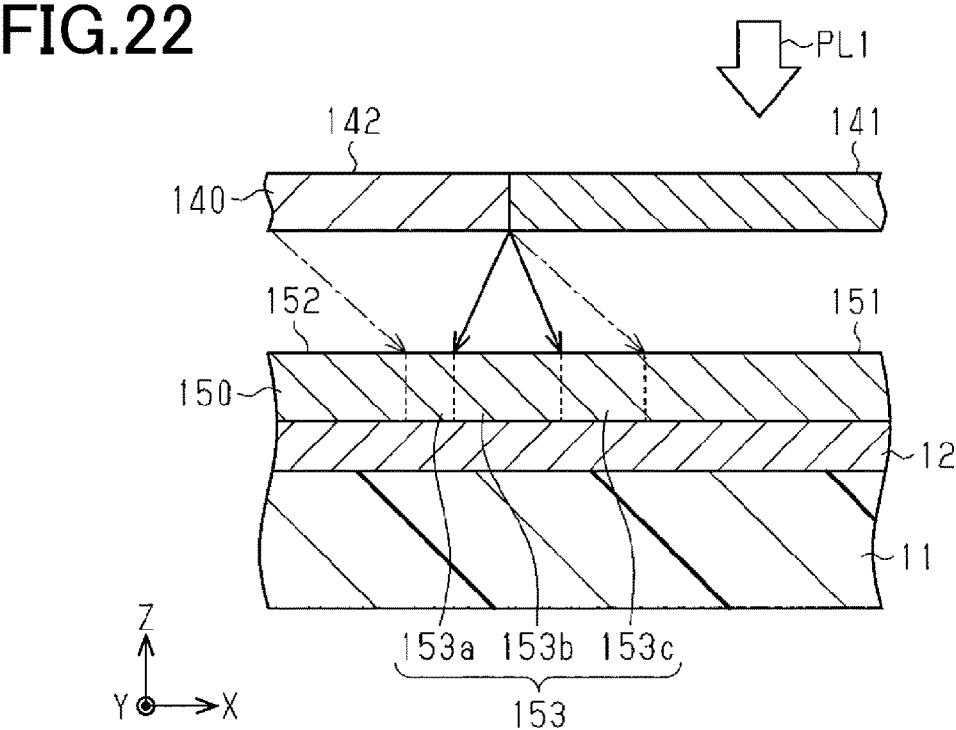
FIG. 22 is a diagram illustrating a step of irradiating the precursor layer with the first polarized light, according to the modification of the second embodiment.

As shown in FIG. 22, a diffraction part 142 of a halftone dot mask 140 may be configured to emit diffracted light toward a precursor layer 150 so as to align with the whole first polarized light PL1 applied from a portion including the boundary between a transmissive part 141 and a diffraction part 142 to the precursor layer 150.

When the halftone dot mask 140 has such a configuration, in the precursor layer 150 that has been irradiated with the first polarized light PL1, a first precursor region 151 irradiated only with light passing through the transmissive part 141 and a second precursor region 152 irradiated only with light passing through the diffraction part 142 are defined. Further, in the precursor layer 150 that has been irradiated with the first polarized light PL1, a third precursor region 153 including a first element 153a, a second element 153b, and a third element 153c is defined.

Among these, the first element 153a is a region irradiated with light passing through the diffraction part 142 and the diffracted light, and the second element 153b is a region irradiated with the diffracted light and light from a portion including the boundary between the transmissive part 141 and the diffraction part 142. The third element 153c is a region irradiated with the diffracted light and light passing through the transmissive part 141.

Figure 23:
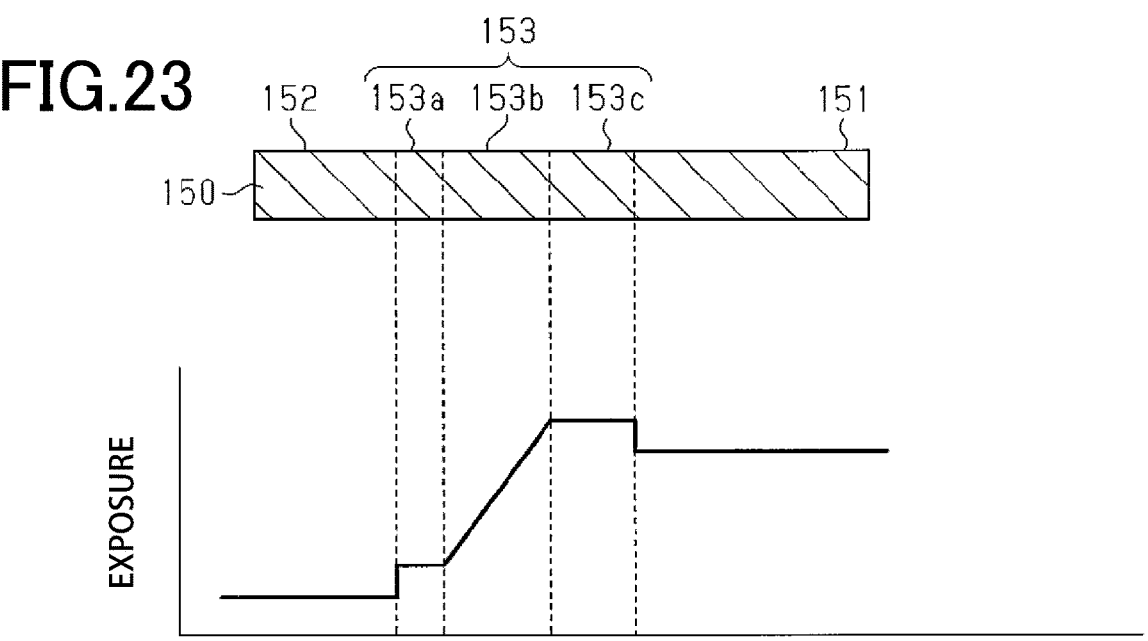
FIG. 23 is a diagram showing exposure distribution in the precursor layer associated with the precursor layer.

Therefore, as shown in FIG. 23, the third element 153c of the third precursor region 153 has the maximum exposure, the first precursor region 151 has the second highest exposure, and the second precursor region 152 has the minimum exposure. The exposure of the second element 153b of the third precursor region 153 continuously increases from the exposure of the first element 153a to the exposure of the third element 153c along a direction from the second precursor region 152 toward the first precursor region 151.

As a result, the alignment regulating direction continuously changes in the second element 153b of the third precursor region 153. In a portion of the liquid crystal layer, the portion contacting the second element 153b, the alignment direction continuously changes along a direction from the second precursor region 152 toward the first precursor region 151.

What is claimed is:

1. A display, comprising:
   a liquid crystal layer containing liquid crystal molecules, and
   an alignment regulating layer having a surface contacting the liquid crystal layer, and having characteristics of regulating alignment of the liquid crystal molecules,
   wherein the alignment regulating layer has a plurality of regulation regions defined in plan view perpendicular to the surface,
   wherein the plurality of regulation regions includes at least one first regulation region, at least one second regulation region, and a third regulation region fitted between the first regulation region and the second regulation region,
   wherein in the alignment regulating layer, a direction in which alignment of the liquid crystal molecules is regulated is an alignment regulating direction,
   wherein the alignment regulating direction in the first regulation region is a first regulating direction,
   wherein the alignment regulating direction in the second regulation region is a second regulating direction that is different from the first regulating direction, and
   wherein in the third regulation region, the alignment regulating direction continuously changes from the first regulating direction to the second regulating direction from a portion contacting the first regulation region toward a portion contacting the second regulation region.

2. The display of claim 1,
   wherein the alignment regulating layer contains photoreactive molecules exhibiting characteristics of regulating the alignment direction of the liquid crystal molecules by irradiation with light;
   and further comprising:
   a substrate made of a resin, and
   a reflective layer provided between the substrate and the alignment regulating layer.

3. A method of manufacturing a display, comprising the steps of:
   forming an alignment regulating layer having a surface, and
   forming a liquid crystal layer containing liquid crystal molecules on the surface of the alignment regulating layer, wherein
   the forming of an alignment regulating layer includes forming a plurality of regulation regions in the alignment regulating layer in plan view perpendicular to the surface, the plurality of regulation regions including at least one first regulation region, at least one second regulation region, and a third regulation region fitted between the first regulation region and the second regulation region,
   in the alignment regulating layer, a direction in which alignment of the liquid crystal molecules is regulated is an alignment regulating direction,
   the alignment regulating direction in the first regulation region is a first regulating direction,
   the alignment regulating direction in the second regulation region is a second regulating direction that is different from the first regulating direction, and
   in the third regulation region, the alignment regulating direction continuously changes from the first regulating direction to the second regulating direction from a portion contacting the first regulation region toward a portion contacting the second regulation region.

4. The method of manufacturing a display of claim 3, wherein the forming of an alignment regulating layer comprises the steps of:
   forming a precursor layer containing photoreactive molecules;
   applying first light through a mask comprising a first mask element for the first regulation region and a second mask element for the second regulation region to form a third precursor region in a portion where the precursor layer aligns with a portion including a boundary that is between the first mask element and the second mask element in a direction in which the precursor layer aligns with the mask, to form a first precursor region in a portion where the precursor layer aligns with the first mask element, the portion excluding the third precursor region, and to form a second precursor region in a portion where the precursor layer aligns with the second mask element, the portion excluding the third precursor region; and
   applying second light to the precursor layer to forming the first regulation region from the first precursor region, to form the second regulation region from the second precursor region, and to form the third regulation region from the third precursor region.

5. The method of manufacturing a display of claim 4, wherein the mask comprises the first mask element and the second mask element, the first mask element has a larger transmissivity with respect to the first light than in the second mask element, the first mask element and the second mask element each have a rectangular shape, and the first mask element and the second mask element are adjacent to each other, as viewed from a direction in which the mask aligns with the precursor layer.

* * * * *